(12) United States Patent
Mori

(10) Patent No.: US 11,687,312 B2
(45) Date of Patent: Jun. 27, 2023

(54) DISPLAY APPARATUS, DATA SHARING SYSTEM, AND DISPLAY CONTROL METHOD

(71) Applicant: Hiroki Mori, Kanagawa (JP)

(72) Inventor: Hiroki Mori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/679,124

(22) Filed: Feb. 24, 2022

(65) Prior Publication Data

US 2022/0300240 A1 Sep. 22, 2022

(30) Foreign Application Priority Data

Mar. 19, 2021 (JP) .................................. 2021-046528

(51) Int. Cl.
*G06F 3/0484* (2022.01)
*G06F 3/0482* (2013.01)
*G06F 3/14* (2006.01)
*G06F 3/04883* (2022.01)

(52) U.S. Cl.
CPC .......... *G06F 3/1454* (2013.01); *G06F 3/0482* (2013.01); *G06F 3/0484* (2013.01); *G06F 3/04883* (2013.01)

(58) Field of Classification Search
None
See application file for complete search history.

(56) References Cited

U.S. PATENT DOCUMENTS

| 5,717,869 A * | 2/1998 | Moran .................... G06Q 10/10 707/999.002 |
| 5,717,879 A * | 2/1998 | Moran .................... G11B 27/11 707/999.002 |
| 7,908,321 B1 * | 3/2011 | Rust ........................ G06Q 10/10 709/227 |
| 9,846,526 B2 * | 12/2017 | Lemus .................. G06F 3/0354 |
| 10,768,885 B1 * | 9/2020 | Fieldman ............... H04L 65/403 |
| 11,061,547 B1 * | 7/2021 | Fieldman ............ G06F 3/04847 |
| 11,281,423 B1 * | 3/2022 | Fieldman ................ G06F 9/451 |
| 11,463,499 B1 * | 10/2022 | Fieldman ............... G06F 3/1454 |
| 2008/0114844 A1 * | 5/2008 | Sanchez .................. H04L 67/75 709/206 |
| 2009/0282359 A1 * | 11/2009 | Saul ....................... G06F 3/0481 715/784 |

(Continued)

FOREIGN PATENT DOCUMENTS

| JP | 2012-048610 | 3/2012 |
| JP | 2016-105241 | 6/2016 |
| JP | 2018-073096 | 5/2018 |

*Primary Examiner* — Ryan Barrett
(74) *Attorney, Agent, or Firm* — Xsensus LLP

(57) ABSTRACT

A display apparatus includes circuitry to acquire history data including a record of an event executed with a plurality of display apparatuses including the display apparatus. The plurality of display apparatuses shares data of a sharing area shared by the plurality of display apparatuses. The sharing area is generated based on the history data. The circuitry displays, on a display screen, at least a part of the sharing area as a display area for the display apparatus. The display area is set based on an operation log included in the history data. The operation log is related to a user at the display apparatus.

13 Claims, 31 Drawing Sheets

(56) References Cited

U.S. PATENT DOCUMENTS

| | | |
|---|---|---|
| 2012/0050197 A1 | 3/2012 | Kemmochi |
| 2014/0223335 A1* | 8/2014 | Pearson ................. G06Q 50/01 |
| | | 715/753 |
| 2016/0085878 A1* | 3/2016 | Kang .................... G06F 16/954 |
| | | 715/201 |
| 2016/0328098 A1* | 11/2016 | Santhakumar ...... G06F 3/04883 |
| 2016/0328114 A1* | 11/2016 | Santhakumar ...... H04L 12/1813 |
| 2016/0378291 A1* | 12/2016 | Pokrzywka ........... G06F 3/0488 |
| | | 715/751 |
| 2017/0134561 A1* | 5/2017 | Senoo ................... G06F 3/0485 |
| 2017/0199750 A1* | 7/2017 | Reuschel .............. G06F 3/041 |
| 2017/0213082 A1* | 7/2017 | Kumar ................. G06V 30/418 |
| 2017/0235537 A1* | 8/2017 | Liu ....................... G06F 3/1454 |
| | | 715/759 |
| 2017/0249294 A1 | 8/2017 | Emori |
| 2018/0300543 A1* | 10/2018 | Kawasaki ............ G06V 30/387 |
| 2019/0121498 A1* | 4/2019 | Jakobovits ............ G06F 3/1454 |
| 2019/0147026 A1* | 5/2019 | Jon ....................... G06F 40/171 |
| | | 715/230 |
| 2019/0362409 A1* | 11/2019 | Srinivasan ......... G06Q 30/0631 |
| 2020/0120149 A1* | 4/2020 | Park .................... H04L 65/4015 |
| 2020/0272324 A1* | 8/2020 | Chanda ................ G06Q 10/103 |
| 2020/0301644 A1* | 9/2020 | Conny Särevall .. G06F 3/04883 |
| 2021/0232634 A1* | 7/2021 | LeVell .................... G06Q 30/02 |
| 2022/0180640 A1* | 6/2022 | Oh ....................... G06V 40/178 |
| 2022/0217304 A1* | 7/2022 | Gandhi ................. G06V 40/28 |

* cited by examiner

FIG. 6
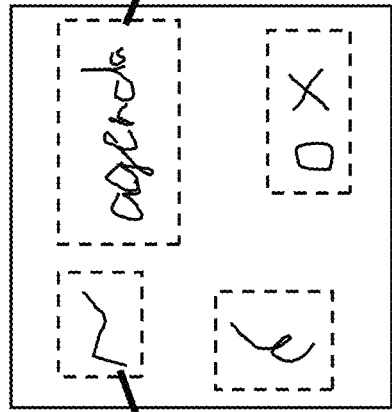
SHARING AREA (HANDWRITING INPUT AREA) (CANVAS WITHOUT LIMIT IN SPACE)
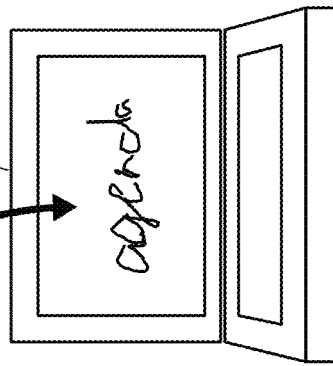
DISPLAY APPARATUS 10B (PC)
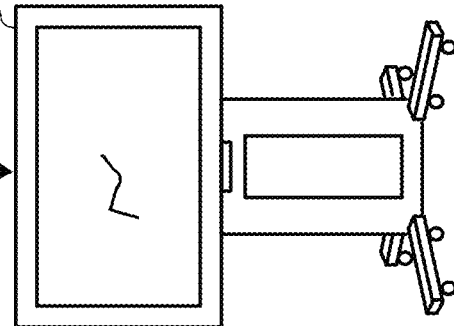
DISPLAY APPARATUS 10A (ELECTRONIC WHITEBOARD)

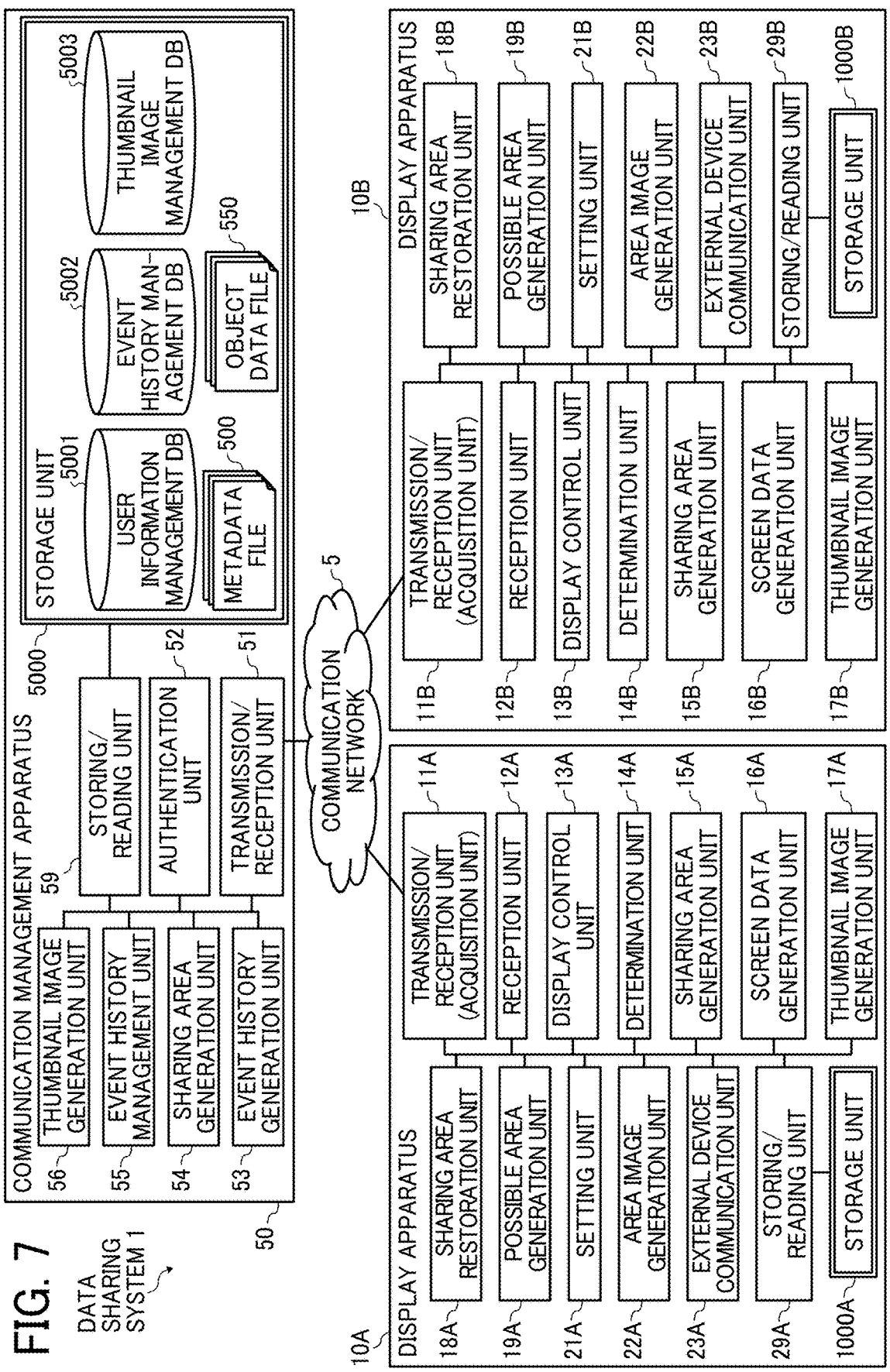

FIG. 8

| USER ID | USER NAME | PASSWORD | E-MAIL ADDRESS |
|---|---|---|---|
| A001 | Taro | a0101 | taro@xxx.com |
| A002 | Jiro | a0202 | jiro@xxx.com |
| A003 | Saburo | a0303 | saburo@xxx.com |
| A004 | Shiro | a0404 | shiro@xxx.com |
| A005 | Hanako | a0505 | hanako@xxx.com |
| ... | ... | ... | ... |

FIG. 9

| EVENT ID | EVENT NAME | EVENT DATE/TIME | PARTICIPATING USER | FILE STORAGE LOCATION |
|---|---|---|---|---|
| G001 | Theme A, Regular meeting | 2021/01/15 13:00 | "A001", "A003" | C:¥Conf¥20210115¥conf1.pdf |
| G002 | Theme B, Meeting | 2021/01/18 13:00 | "A001", "A002", "A003" | C:¥Conf¥20210118¥conf1.pdf |
| G003 | Interview | 2021/01/18 15:00 | "A002", "A004" | C:¥Conf¥20210118¥conf2.pdf |
| G004 | ZZ Seminar | 2021/01/19 15:00 | "A001", "A002", "A003", "A004" | C:¥Conf¥20210119¥conf1.pdf |
| G005 | Negotiation with X company | 2021/01/20 10:00 | "A005", "A004" | C:¥Conf¥20210120¥conf1.pdf |
| ... | ... | ... | ... | ... |

FIG. 10

```
{
  "Conference":[
    {
      "Name":" Theme A, Regular Meeting 1"
      "Start": "2021/01/15 13:00",
      "End": "2021/01/15 15:00",
      "OperationLog":[
        {
          "User":"A001",
          "ViewArea":[
            {"X":10,"Y":310,"Width":100,"Height":80,"Time":100},
            {"X":100,"Y":210,"Width":100,"Height":80,"Time":10},
            {"X":150,"Y":130,"Width":50,"Height":20,"Time":1000},
            {"X":120,"Y":104,"Width":100,"Height":80,"Time":10},
            {"X":130,"Y":1300,"Width":100,"Height":80,"Time":100},
          ]
        },
        {
          "User":" A003",
          "ViewArea":[
            {"X":10,"Y":310,"Width":100,"Height":80,"Time":100},
            {"X":105,"Y":1200,"Width":100,"Height":80,"Time":20000},
          ]
        },
      ]
    }
  ]
}
```

FIG. 11

```
{
  "BackgroundColor" : "White",
  "Objects" : [
        {
                "Type" : "Stroke",
                "Data" : {
                        "Points" : [
                                { "X" : 10, "Y" : 10 },
                                { "X" : 20, "Y" : 20 },
                                { "X" : 30, "Y" : 30 },]
                        "Thin" : 5,
                        "Color" : "Black",}
                "User" : "A001",
                "Date": "2021/01/15 13:32",
        },
        {
                "Type" : "Stamp",
                "Data" : {
                        "Points" : { "X" : 100, "Y" : 200 },
                        "Size" : { "Width" : 20, "Height" : 20 },
                        "Image" : "Circle.jpg",}
                "User" : "A003",,
                "Date": "2021/01/15 13:40",
        }
  ]
}
```

FIG. 22

| EVENT ID | STORAGE LOCATION | USER ID |
|---|---|---|
| G001 | C:¥Conf¥20210115¥conf1.Taro.jpg | "A001" |
| G001 | C:¥Conf¥20210118¥conf1.Saburo.jpg | "A003" |
| G002 | C:¥Conf¥20210118¥conf1.Taro.jpg | "A001" |
| G002 | C:¥Conf¥20210118¥conf1.Jiro.jpg | "A002" |
| G002 | C:¥Conf¥20210118¥conf1.Saburo.jpg | "A003" |
| G003 | C:¥Conf¥20210118¥conf2.Jiro.jpg | "A002" |
| G003 | C:¥Conf¥20210118¥conf2.Siro.jpg | "A004" |
| ... | ... | ... |

FIG. 24

```
{
  "Conference":[
    {
      "Name":"Theme A, Regular Meeting 1"
      "Start": "2021/01/15 13:00",
      "End": "2021/01/15 15:00",
      "OperationLog":[
          {
              "User":"A001",
              "ViewArea":[
                      {"X":10,"Y":310,"Width":100,"Height":80,"Time":100},
                      {"X":100,"Y":210,"Width":100,"Height":80,"Time":10},
                      {"X":150,"Y":130,"Width":50,"Height":20,"Time":1000},
                      {"X":120,"Y":104,"Width":100,"Height":80,"Time":10},
                      {"X":130,"Y":1300,"Width":100,"Height":80,"Time":100},
                      ]
          },
          ]
    }
  ]
}
```

FIG. 26

| EVENT ID | STORAGE LOCATION | USER ID |
|---|---|---|
| G001 | C:¥Conf¥20210115¥conf1.Taro.jpg | "A001" |
| G002 | C:¥Conf¥20210118¥conf1.Taro.jpg | "A001" |
| ... | ... | ... |

```
{
"Conference":[
    {
    "Name":"Theme A, Regular Meeting 1"
    "Start":"2021/01/15 13:00",
    "End":"2021/01/15 15:00",
    "OperationLog":[
        {
            "User":"A001",
            "ViewArea":[
                {"Page":1,"X":50,"Y":105,"Width":60,"Height":80,"Time":100},
                {"Page":3,"X":100,"Y":210,"Width":100,"Height":80,"Time":40},
                {"Page":6,"X":50,"Y":105,"Width":50,"Height":20,"Time":800},
                {"Page":8,"X":84,"Y":78,"Width":100,"Height":80,"Time":10},
            ]
        },
        {
            "User":"A003",
            "ViewArea":[
                {"Page":3,"X":10,"Y":80,"Width":100,"Height":80,"Time":100},
                {"Page":7,"X":105,"Y":100,"Width":100,"Height":80,"Time":20000}
            ]
        },
    ]
    }
]
}
```

FIG. 30

```
{
  "BackgroundColor" : "White",
  "Objects" : [
    {
      "Type" : "Stroke",
      "Data" : {
        "Points" : [
          { "Page" : 1," X" : 10, "Y" : 10 },
          { "Page" : 1," "X" : 20, "Y" : 20 },,
          { "Page" : 1,"X" : 30, "Y" : 30 },]
        "Thin" : 5,
        "Color" : "Black",}
      "User" : "A001",
      "Date": " 2021/01/15 13:32",
    },
    {
      "Type" : "Stamp",
      "Data" : {
        "Points" : {"Page" : 3,"X" : 100, "Y" : 200 },
        "Size" : { "Width" : 20, "Height" : 20 },
        "Image" : "Circle.jpg",}
      "User" : "A003",,
      "Date": "2021/01/15 13:40",
    }
  ]
}
```

550a

DISPLAY APPARATUS, DATA SHARING SYSTEM, AND DISPLAY CONTROL METHOD

CROSS-REFERENCE TO RELATED APPLICATION

This patent application is based on and claims priority pursuant to 35 U.S.C. § 119(a) to Japanese Patent Application No. 2021-046528, filed on Mar. 19, 2021, in the Japan Patent Office, the entire disclosure of which is hereby incorporated by reference.

BACKGROUND

Technical Field

Embodiments of the present disclosure relate to a display apparatus, a data sharing system, and a display control method.

Related Art

Display apparatuses that allow multiple users to input handwriting are used in meetings and the like in companies, educational institutions, and administrative institutions, for example. Further, technologies are known that enable multiple users to participate in a teleconference from different locations and to input handwriting to the same screen from their own locations respectively, while sharing display screens, each being displayed at each of the different locations.

In addition, in case that an event such as a conference is held multiple times, a method of reproducing a display screen displayed in a previous event when the event is resumed is known. For example, a material related to a different topic is distinguished from a material related to another topic, and an arrangement of material images, each of which is corresponding to one of the materials, displayed at a certain time in the past is reproduced.

SUMMARY

An exemplary embodiment of the present disclosure includes a display apparatus including circuitry to acquire history data including a record of an event executed with a plurality of display apparatuses including the display apparatus. The plurality of display apparatuses shares data of a sharing area shared by the plurality of display apparatuses. The sharing area is generated based on the history data. The circuitry displays, on a display screen, at least a part of the sharing area as a display area for the display apparatus. The display area is set based on an operation log included in the history data. The operation log is related to a user at the display apparatus.

An exemplary embodiment of the present disclosure includes a data sharing system including circuitry to acquire history data including a record of an event executed with a plurality of display apparatuses. The plurality of display apparatuses shares data of a sharing area being generated based on the history data. The circuitry controls at least one of the plurality of display apparatuses to display, on a display screen, at least a part of the sharing area as a display area for the at least one apparatus. The display area is set based on an operation log included in the history data. The operation log is related to a user at the at least one display apparatus.

An exemplary embodiment of the present disclosure includes a display control method. The display control method includes acquiring history data indicating a record of an event executed with a plurality of display apparatuses. The plurality of display apparatuses shares data of a sharing area shared by the plurality of display apparatuses. The sharing area is generated based on the history data. The display control method includes displaying, on a display screen, at least a part of the sharing area as a display area. The display area is set based on an operation log of a user included in the history data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a schematic diagram illustrating a relation between a sharing area shared by a plurality of display apparatuses and display screens, each being displayed on a corresponding one of the plurality of display apparatuses, according to an embodiment of the present disclosure;

FIG. 7 is a diagram illustrating an example of a functional configuration of a data sharing system according to an embodiment of the present disclosure;

FIG. 8 is a conceptual diagram illustrating an example of a user information management table, according to an embodiment of the present disclosure;

FIG. 9 is a conceptual diagram illustrating an example of an event history management table, according to an embodiment of the present disclosure;

FIG. 10 is a view of an example of a metadata file, according to an embodiment of the present disclosure;

FIG. 11 is a view of an example of the object data file, according to an embodiment of the present disclosure;

FIG. 22 is a conceptual diagram illustrating an example of a thumbnail image management table, according to an embodiment of the present disclosure;

FIG. 24 is a view of another example of a metadata file, according to an embodiment of the present disclosure;

FIG. 26 is a conceptual diagram illustrating another example of a thumbnail image management table, according to an embodiment of the present disclosure;

FIG. 29 is a view of an example of a metadata file, according to a variation of the embodiments of the present disclosure;

FIG. 30 is a view of an example of an object data file, according to a variation of the embodiments of the present disclosure;

Figure 1:
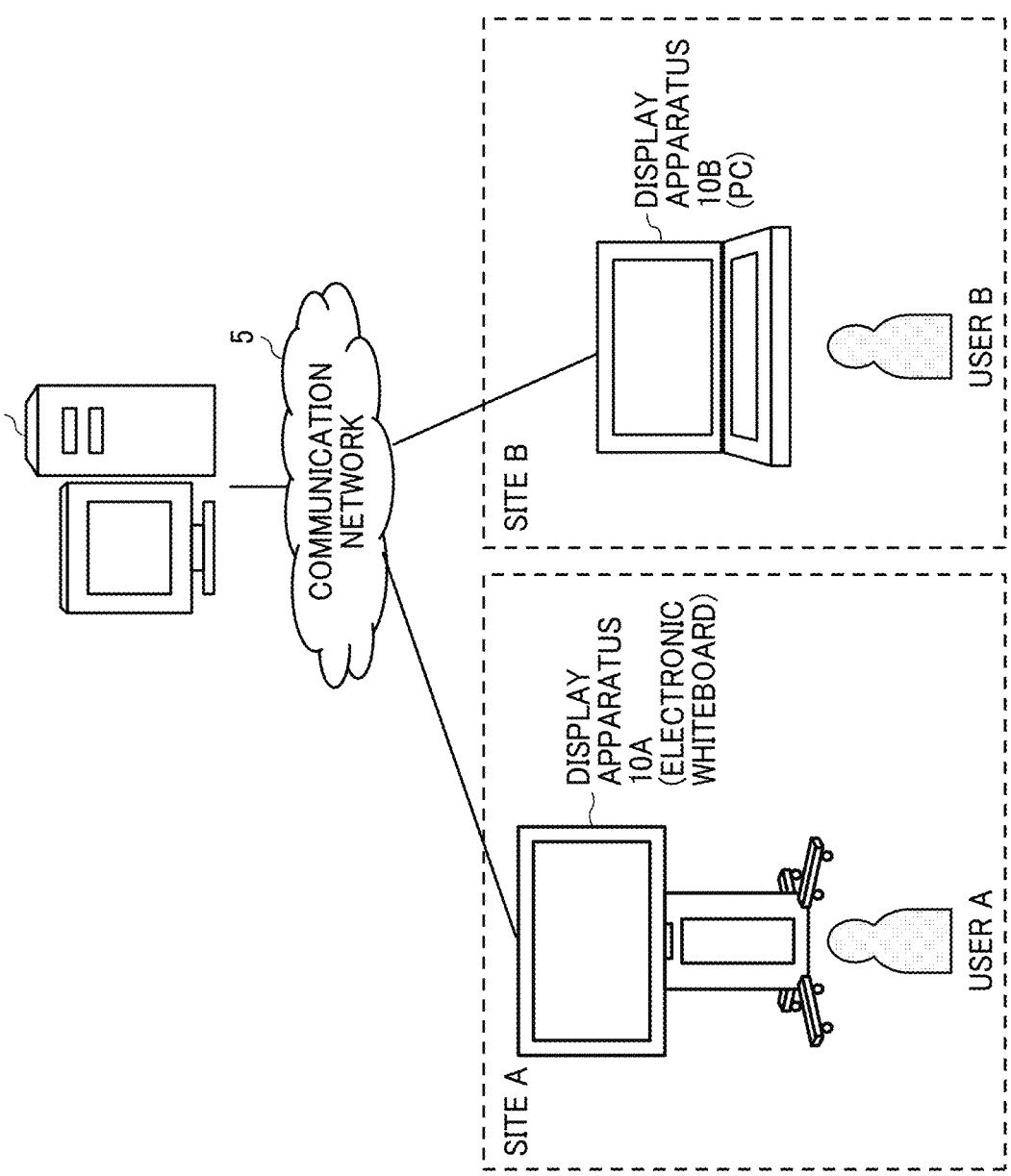
FIG. 1 is a diagram illustrating an example of an overall configuration of a data sharing system according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below with reference to the drawings. In the description of the drawings, the same elements are denoted by the same reference numerals, and redundant descriptions thereof are omitted.

Embodiment

System Configuration:

Referring to FIG. 1, an overview of a data sharing system 1 is described according to an embodiment. FIG. 1 is a diagram illustrating an example of an overall configuration of the data sharing system 1 according to the present embodiment. The data sharing system 1 illustrated in FIG. 1 is a system that allows a plurality of display apparatuses 10 to share data that can be displayed on each of the plurality of display apparatuses 10.

As illustrated in FIG. 1, the data sharing system 1 includes a display apparatus 10A, a display apparatus 10B, which are respectively provided at different sites, e.g., a site A and a site B, and a communication management apparatus 50. The display apparatus 10A, the display apparatus 10B, and the communication management apparatus 50 included in the data sharing system 1 are communicably connected to each other through a communication network 5. The communication network 5 is implemented by the Internet, a mobile communication network, a local area network (LAN), for example. The communication network 5 may include a network by not only wired communications but also a network by wireless communications such as 3rd generation (3G), 4th generation (4G), 5th generation (5G), Wireless Fidelity® (Wi-Fi), Worldwide Interoperability for Microwave Access (WiMAX) or Long Term Evolution (LTE).

Each of the display apparatus 10A and the display apparatus 10B is a computer having a user hand drafted input capability, a communication capability, and a display capability. The display apparatus 10A is, for example, an electronic whiteboard located at the site A. The display apparatus 10B is, for example, a portable laptop personal computer (PC) and currently used at the site B. The display apparatus 10A and the display apparatus 10B perform remote communication while sharing an object input by user hand drafted input, such as handwriting and drawing. A user A and a user B conduct an event such as a teleconference while viewing a sharing area (shared area) in which display contents are shared at the sites. The teleconference is merely one example of the event. Examples of the event include, but are not limited to, a distance learning, a remote medical examination, an online meeting, an online consultation, and a simple conversation over the communication network 5. In the present disclosure, "hand drafted input" relates to a user input such as handwriting, drawing and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The following discussion will refer to handwriting input and handwriting input data, but other forms of hand drafted input may be utilized and are within the scope of the present disclosure.

The display apparatus 10A and the display apparatus 10B communicate screen information including object data that is input by handwriting, with one another. The object data is data used for displaying (reproducing) a display screen including an object representing a handwriting input performed by the user A and user B on the display apparatus 10A and the display apparatus 10B, respectively. The object data includes, for example, coordinate data, line width data, line color data, vector data, and data indicating a writing pressure when a stroke is input.

The display apparatus 10A and the display apparatus 10B transmit or receive the object data representing an object to be shared, and the users using the data sharing system 1 to share the object, accordingly. The object is an image indicating a line, etc., written by the user by handwriting input with an electronic pen, for example. An object is displayed based on the object data representing points that indicate coordinates on the display.

The electronic whiteboard and the PC are merely examples of the display apparatus 10. The electronic whiteboard can be any suitable apparatus installed with software that execute a handwriting input capability, a communication capability, and a display capability. Further, the PC includes, for example, a smartphone, a tablet terminal, a wearable terminal, a smartwatch, a car navigation terminal, a game console, a telepresence robot, and a medical device.

FIG. 1 illustrates an example in which the data sharing system 1 includes a plurality of display apparatuses 10 (i.e., the display apparatus 10A and the display apparatus 10B) at the two sites (i.e., the site A and the site B). In another example, the data sharing system 1 may include the plurality of display apparatuses 10 at one site. In another example, the data sharing system 1 includes the plurality of display apparatus 10 at three or more sites, in each of which the display apparatus is located or used. In still another example, the data sharing system 1 includes the plurality of display apparatus 10 at a single site. In a case where the plurality of display apparatus 10 are located in one site, the number of sites can be one. In the following description, the display apparatus 10A and the display apparatus 10B are collectively referred to as a "display apparatus 10", unless they need to be distinguished from each other.

The communication management apparatus 50 is a server computer that centrally manages login authentication from the display apparatus 10A and the display apparatus 10B, communication statuses of the display apparatus 10A and the display apparatus 10B, and screen data to be shared. Further, the communication management apparatus 50 relays the screen data to be shared among the display apparatus 10A and the display apparatus 10B.

The communication management apparatus 50 can be implemented by a single server computer or can be implemented by a plurality of server computers. The description is given of an example in which the communication management apparatus 50 is a server computer that resides in a cloud environment. In another example, the communication management apparatus 50 is a server operating on the display apparatus 10 such as an electronic whiteboard. In still another example, the communication management apparatus 50 is a server that resides in an on-premises environment.

Figure 2:
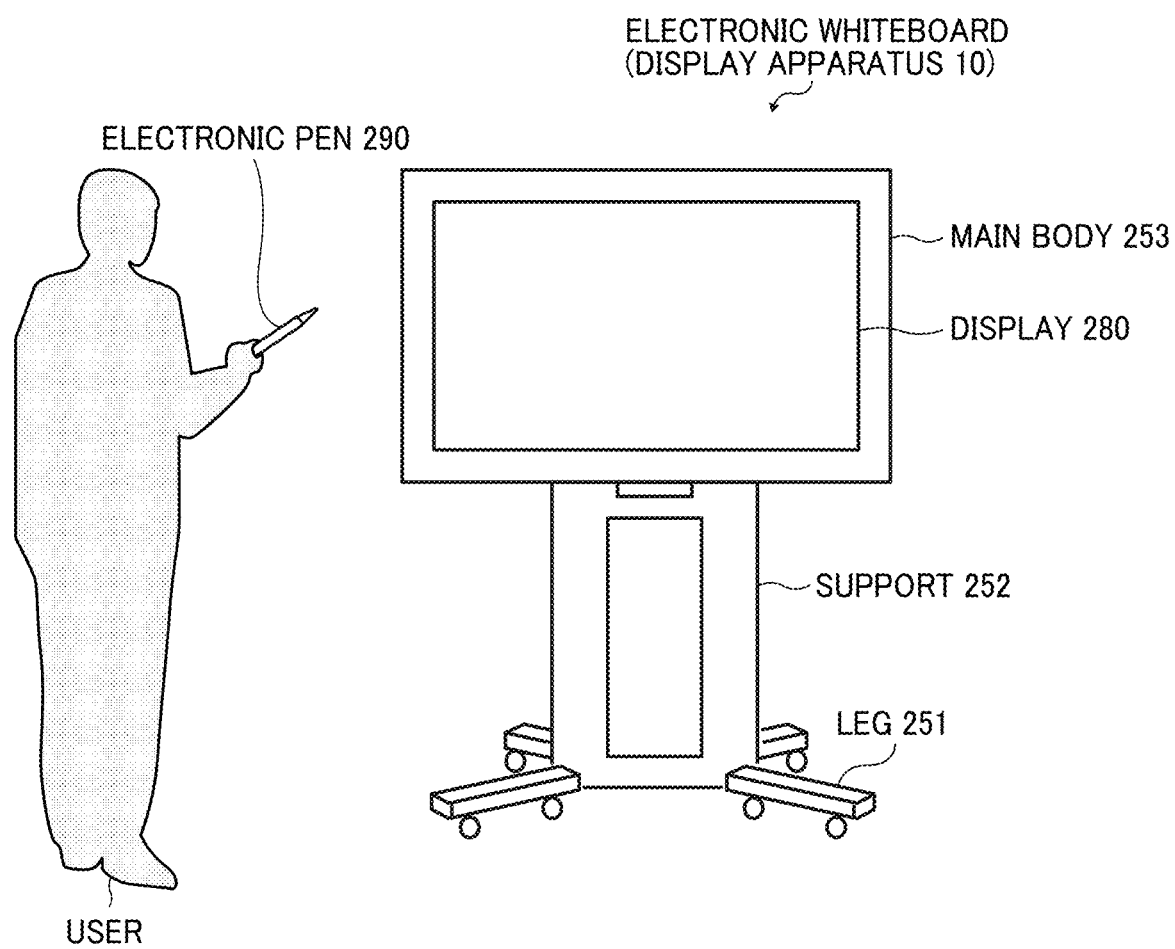
FIG. 2 is a diagram for describing an example of how an electronic whiteboard is used, according to an embodiment of the present disclosure.

Use Scenario of Electronic Whiteboard:

Referring to FIG. 2, a description is provided of how an electronic whiteboard as an example of the display apparatus 10 is used. FIG. 2 is a diagram for describing an example of how the electronic whiteboard is used. As illustrated in FIG. 2, the electronic whiteboard as an example of the display apparatus 10 includes a plurality of legs 251 each having a plurality of casters on the lower side, a support 252 provided on the upper side of the plurality of legs 251, and a main body 253 of the electronic whiteboard provided on top of the support 252, and a display 280 provided on the front surface of the main body 253. The main body 253 includes a central processing unit (CPU) 201 and the like described below. The user can input (draw) an object such as characters on the display 280 using an electronic pen 290. The display 280 is an example of a display (display device).

Figure 3:
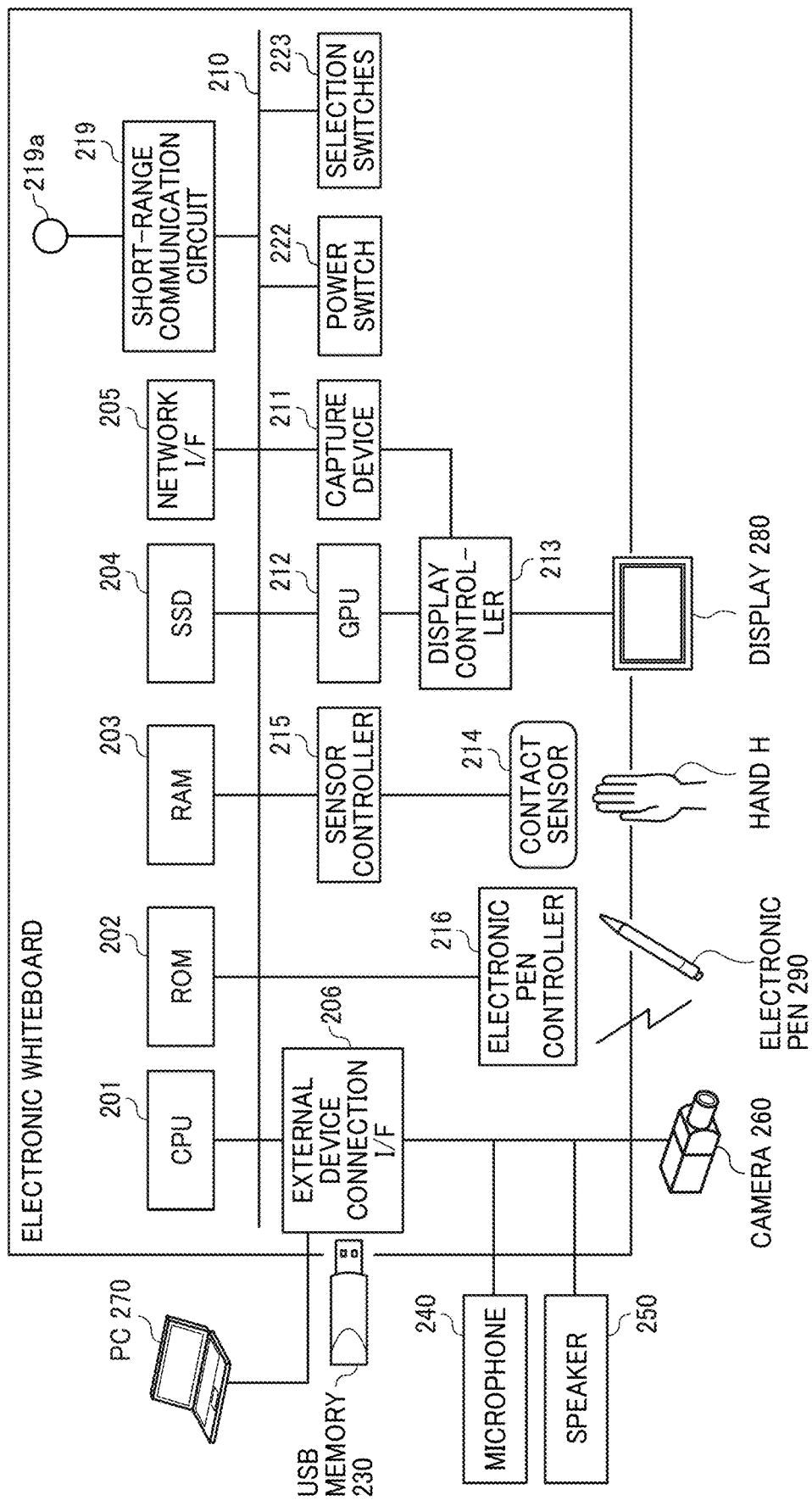
FIG. 3 is a block diagram illustrating an example of a hardware configuration of an electronic whiteboard according to an embodiment of the present disclosure.
Figure 4:
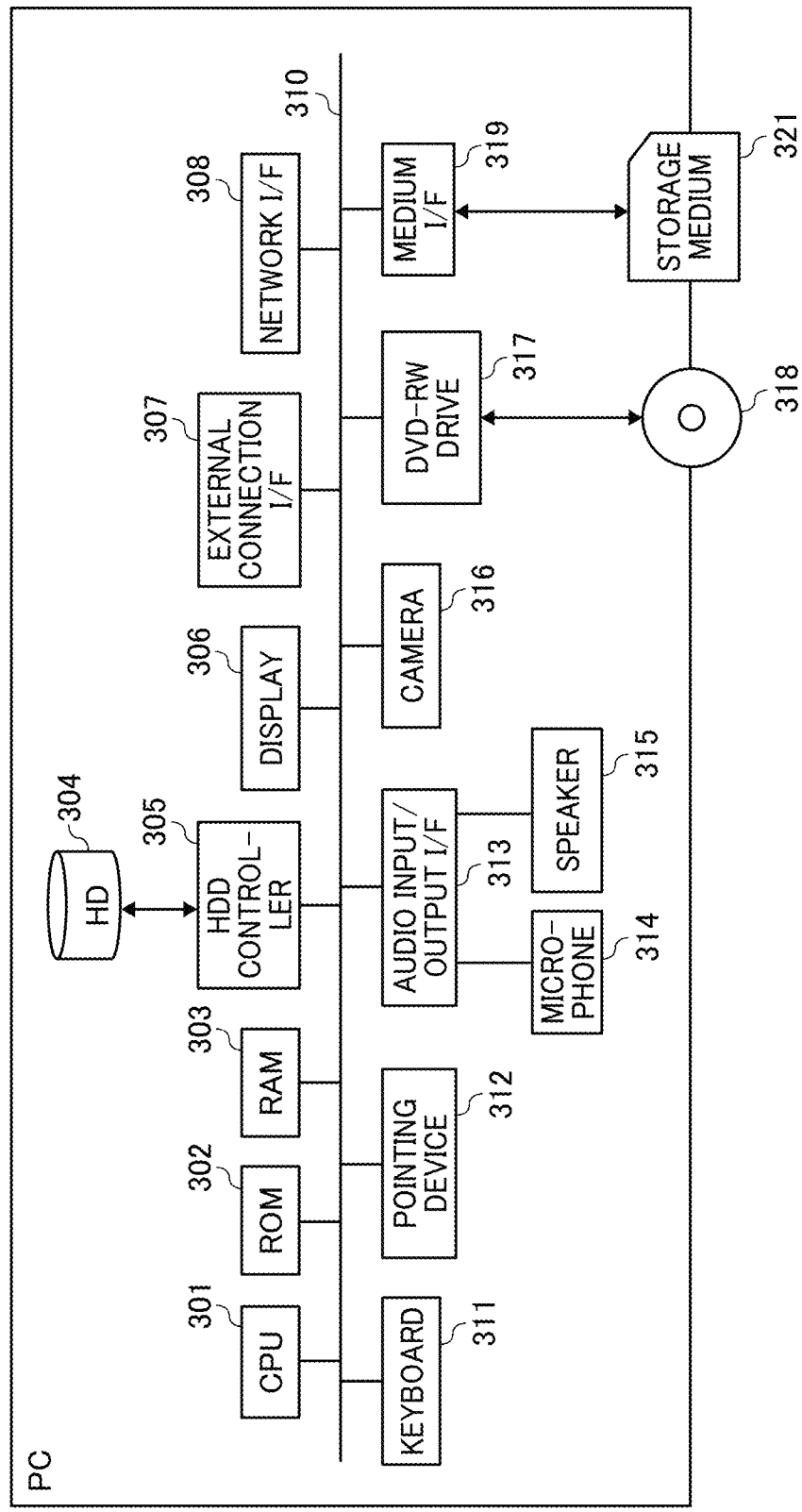
FIG. 4 is a block diagram illustrating an example of a hardware configuration of a personal computer (PC) according to an embodiment of the present disclosure.
Figure 5:
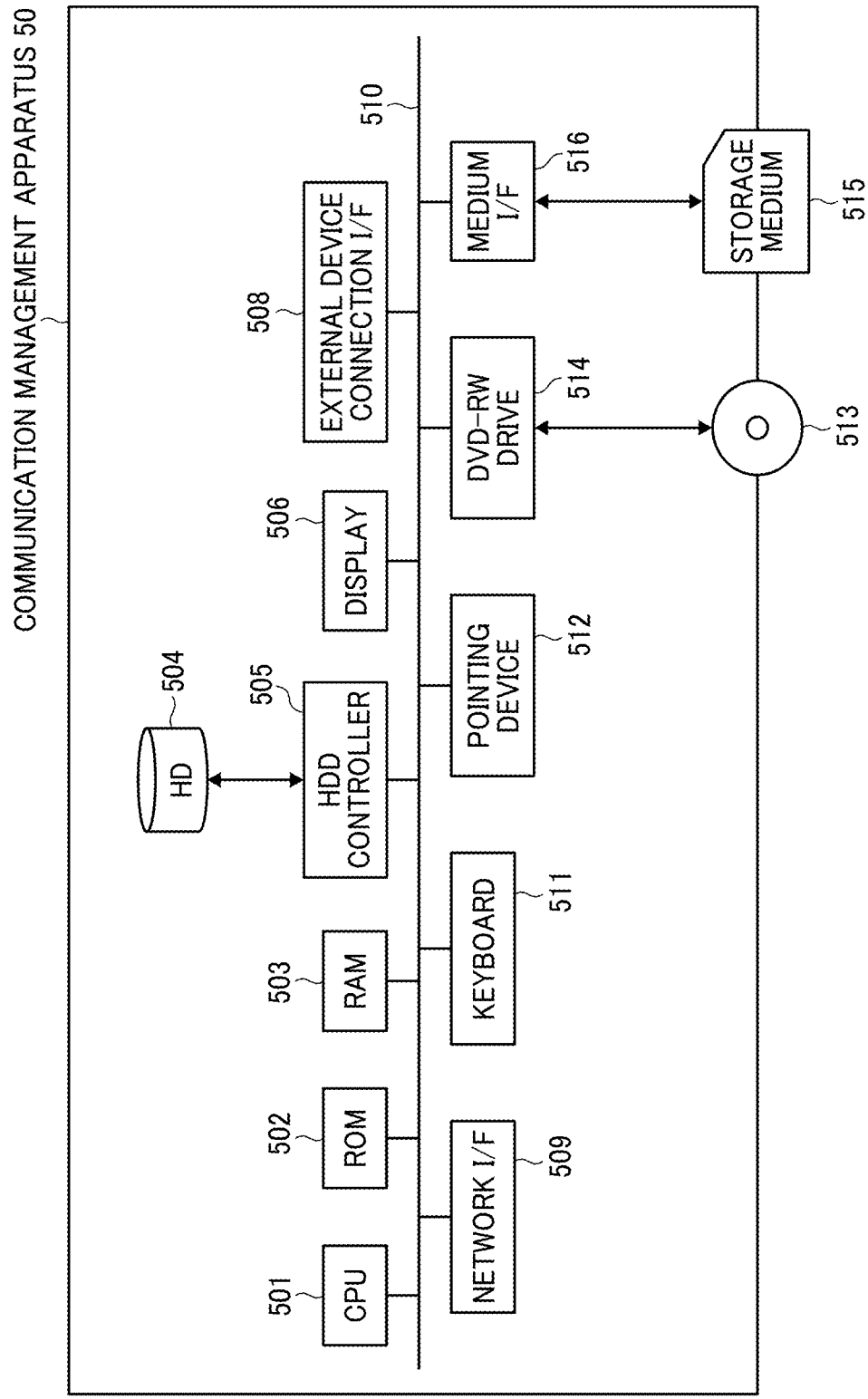
FIG. 5 is a block diagram illustrating an example of a hardware configuration of a communication management apparatus according to an embodiment of the present disclosure.

Hardware Configuration:

Referring to FIG. 3 to FIG. 5, examples of hardware configurations of each apparatus, device, and terminal of the data sharing system 1 are described, according to the present embodiment. In the hardware configurations illustrated in FIG. 3 to FIG. 5, certain hardware elements may be added or omitted as appropriate.

Hardware Configuration of Electronic Whiteboard:

Referring to FIG. 3, a hardware configuration of an electronic whiteboard as an example of the display apparatus 10 is described. FIG. 3 is a block diagram illustrating an example of a hardware configuration of the electronic whiteboard. Each hardware element of the electronic whiteboard as an example of the display apparatus 10 is denoted by a reference numeral in 200 series. As illustrated in FIG. 3, the electronic whiteboard includes a CPU 201, a read only memory (ROM) 202, a random access memory (RAM) 203, a solid state drive (SSD) 204, a network interface (I/F) 205, and an external device connection I/F 206.

The CPU 201 controls entire operation of the electronic whiteboard. The ROM 202 stores a control program such as an initial program loader (IPL) to boot the CPU 201. The RAM 203 is used as a work area for the CPU 201. The SSD 204 stores various data such as a control program for the electronic whiteboard. The network I/F 205 controls communication with the communication network 5. The external device connection I/F 206 controls communication with an external device such as a universal serial bus (USB) memory 230, a PC 270, a microphone 240, a speaker 250, or a camera 260.

The electronic whiteboard further includes a capturing device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and selection switches 223.

The capturing device 211 acquires image data of an image displayed on a display 280, as an example of a display (display device), under control of the display controller 213, and stores the image data in the RAM 203, for example. The GPU 212 is a semiconductor chip (processor) dedicated to processing a graphical image. The display controller 213 controls and manages a screen display to output an image output from the capturing device 211 or the GPU 212 to the display 280, for example. The contact sensor 214 detects contact with the display 280 by an electronic pen (stylus pen) 290 or a user's hand H. The sensor controller 215 controls processing performed by the contact sensor 214. The contact sensor 214 senses a touch input to a specific coordinate on the display 180 using the infrared blocking system. The light-receiving elements emit a plurality of infrared rays parallel to a surface of the display 280. The light-receiving elements receive light passing in the direction that is the same as an optical path of the emitted infrared rays, which are reflected by the reflector frame. More specifically, the display 280 is provided with two light-receiving elements disposed on both upper side ends of the display 280, and a reflector frame surrounding the sides of the display 280. The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen 290 to detect contact by the tip or bottom of the electronic pen with the display 280. The short-range communication circuit 219 is a communication circuit that communicates in compliance with the near field communication (NFC), the Bluetooth®, and the like. The power switch 222 turns on or off the power of the electronic whiteboard. The selection switches 223 are a group of switches for adjusting brightness, hue, etc., of display on the display 280, for example.

The electronic whiteboard further includes a bus line 210. The bus line 210 is an address bus or a data bus that electrically connects the elements illustrated in FIG. 3, such as the CPU 201, to each other.

The contact sensor 214 is not limited to the infrared blocking system type, which is described above, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object against the display. In addition to or in alternative to detecting a touch by the tip or bottom of the electronic pen 290, the electronic pen controller 216 may also detect a touch by another part of the electronic pen 290, such as a part held by a hand of the user.

Hardware Configuration of PC:

Referring to FIG. 4, a hardware configuration of the PC as an example of the display apparatus 10 is described. FIG. 4 is a block diagram illustrating an example of a hardware configuration of the PC. Each hardware element of the PC as an example of the display apparatus 10 is denoted by a reference numeral in 300 series. As illustrated in FIG. 4, the PC includes a CPU 301, a ROM 302, a RAM 303, a hard disc (HD) 304, a hard disk drive (HDD) controller 305, a display 306, an external device connection I/F 307, a network I/F 308, a bus line 310, a keyboard 311, a pointing device 312, an audio input/output I/F 313, a microphone 314, a speaker 315, a camera 316, a digital versatile disk-rewritable (DVD-RW) drive 317, and a medium I/F 319.

The CPU 301 controls overall operation of the PC. The CPU 301 is an arithmetic device that reads programs and data stored in, for example, the ROM 302 or the HD 304 to the RAM 303 and executes processing according to the programs or data to implement functions of the PC. The ROM 302 is a nonvolatile memory in which a control program such as an IPL used for booting the CPU 301 are stored. The RAM 303 is a volatile memory used as a work area for the CPU 301. The HD 304 stores various data such as a control program. The HDD controller 305 controls reading or writing of various data to or from the HD 304 under control of the CPU 301. The display 306 displays various information such as a cursor, menu, window, characters, or image. In one example, the display 306 is a touch panel display provided with an input device. The display 306 is an example of a display (display device). The external device connection I/F 307 is an interface that connects the PC to various external devices. Examples of the external devices include, but are not limited to, a USB memory and a printer. The network I/F 308 is an interface that controls communication of data with an external device through the communication network 5. The bus line 310 is an address bus or a data bus, which electrically connects the hardware elements in FIG. 4 such as the CPU 301.

The keyboard 311 is an example of an input device including a plurality of keys for inputting characters, numerical values, various instructions, and the like. The pointing device 312 is an example of an input device that allows a user to select or execute a specific instruction, select a target for processing, or move a cursor being displayed. The keyboard 311 and the pointing device 312 are merely examples of the input device. In another example, a touch panel, a voice input device, or the like is used as the input device. The audio input/output I/F 313 is a circuit for inputting or outputting an audio signal to the microphone 314 or from the speaker 315 under control of the CPU 301. The microphone 314 is an example of audio collecting device, which is a built-in type, inputs audio. The speaker 315 is an example of an output device, which is a built-in type, outputs an audio signal. The camera 316 is an example of an imaging device, which is a built-in type, captures a subject to obtain image data. Note that the microphone 314, the speaker 315, and the camera 316 may be an external device in alternative to the built-in device of the PC. The DVD-RW drive 317 controls reading or writing of various data from or to a DVD-RW 318, which is an example of a removable recording medium (removable storage medium). The removable recording medium is not limited to the DVD-RW and may be a digital versatile disk-recordable (DVD-R), or a BLU-RAY (registered trademark) disc (BLU-RAY disk), for example.

A disc (Blu-ray disc) may also be used as the removable recording medium. The medium I/F 319 controls reading or writing (storing) of data with from or to a storage medium 321 such as a flash memory.

Hardware Configuration of Communication Management Apparatus:

Referring to FIG. 5, a hardware configuration of the communication management apparatus 50 is described. FIG. 5 is a block diagram illustrating an example of a hardware configuration of the communication management apparatus 50. Each hardware element of the communication management apparatus 50 is denoted by a reference numeral in 500 series. The communication management apparatus 50 is implemented by a computer as illustrated in FIG. 5 including a CPU 501, a ROM 502, a RAM 503, an HD 504, an HDD controller 505, a display 506, an external device connection I/F 508, a network I/F 509, a bus line 510, a keyboard 511, a pointing device 512, a DVD-RW drive 514, and a medium I/F 516.

The CPU 501 controls overall operation of the communication management apparatus 50. The CPU 501 is an arithmetic device that reads programs and data stored in, for example, the ROM 502 or the HD 504 to the RAM 503 and executes processing according to the programs or data to implement functions of the communication management apparatus 50. The ROM 502 is a nonvolatile memory in which a control program such as an IPL used for booting the CPU 501 are stored. The RAM 503 is a volatile memory used as a work area for the CPU 501. The HD 504 stores various data such as a program. The HDD controller 505 controls reading or writing of various data to or from the HD 504 under control of the CPU 501. The display 506 displays various types of information such as a cursor, a menu, a window, characters, or an image. The external device connection I/F 508 is an interface for connecting to various external devices. Examples of the external devices include, but are not limited to, a USB memory. The network I/F 509 is an interface that controls communication of data with an external device through the communication network 5. The bus line 510 is, for example, an address bus or a data bus, which electrically connects the elements such as the CPU 501 illustrated in FIG. 5.

The keyboard 511 is an example of an input device including a plurality of keys for inputting characters, numerical values, various instructions, and the like. The pointing device 512 is an example of the input device that allows a user to select or execute various instructions, select a target for processing, or move a cursor being displayed. The DVD-RW drive 514 controls reading or writing of various data to or from a DVD-RW 513, which is an example of a removable recording medium. The removable recording medium is not limited to the DVD-RW and may be a DVD-R, or a BLU-RAY (registered trademark) disc (BLU-RAY disk), for example. The medium I/F 516 controls reading or writing (storing) of data from or to a storage medium (recording medium) 515 such as a flash memory.

Further, any one of the above-described control programs may be recorded in a file in a format installable or executable on a computer-readable recording medium for distribution. Examples of the recording medium include a Compact Disc Recordable (CD-R), a DVD, a BLU-RAY Disc, a secure digital (SD) card, and a USB memory. In addition, such recording media may be provided in the domestic markets or foreign markets as program products. For example, the display apparatus 10 executes the control program to implement a display control method according to an embodiment of the present disclosure.

Overview

Referring to FIG. 6, a sharing area that is an area shared by the display apparatus 10A and the display apparatus 10B and display screens each of which is displayed by one of the display apparatus 10A and the display apparatus 10B are described. FIG. 6 is a schematic diagram illustrating a relation between the sharing area shared by a plurality of display apparatuses 10 and the display screens, each being displayed on each of the plurality of display apparatuses.

In FIG. 6, the display apparatus 10A and the display apparatus 10B share the objects drawn on their respective displays as a sharing area, to conduct an event such as a teleconference. The sharing area is a handwriting input area that is shared by a plurality of users and receives handwriting inputs performed by the plurality of users. The sharing area is also referred to as a whiteboard, a shared canvas, a handwriting input area, a drawing area, or a writing area, for example. The display apparatus 10A and the display apparatus 10B transmits or receives the handwriting input data for displaying each object drawn on the display apparatuses. Thus, the sharing area is displayed on a display screen as being shared.

The sharing area is an expandable area. In other words, the sharing area is an area in which handwriting can be input without any size restrictions. The sharing area includes, for example, a so-called infinite canvas (canvas without limit in space) and a finite canvas (canvas with limit in space). In other words, the sharing area is an area larger than an area that can be displayed on a display screen of the display apparatus 10. Accordingly, as illustrated in FIG. 6, each of the display apparatus 10A and the display apparatus 10B displays at least a part of the sharing area on the display screen. Each of the display apparatus 10A and the display apparatus 10B displays a part of the sharing area instead of displaying the entire area. This allows a user to perform handwriting input and to recognize content of an object input by handwriting easily. Further, since the display apparatus 10A and the display apparatus 10B can display different areas of the sharing area, each user can view a desired area while the event is being conducted.

In a case where a part of the sharing area, which is shared with another display apparatus 10, is to be displayed in an event, in order to smoothly resume the event, which ends in a middle in the past, an appropriate area is desired to be displayed on the display screen in reading a file of the event used in the past. For example, in a case where the center of the sharing area is displayed as the initial position without taking into account a writing position or what is written, the user first checks where the objects are and what is written by looking at the sharing area as a whole after the event is resumed, resulting in difficulty to start the conference smoothly. In addition, there is a case where an area desired to be browsed in the sharing area is different for each user who participates in the event. However, with a conventional method, a different display screen is not available to be displayed for each display apparatus used by a user when an event is resumed. As described above, with such a conventional method still have a room for improvement in a display method for displaying a display screen for each user in the case of resuming an event carried out by a plurality of users.

In view of the above, the data sharing system 1 sets, for each user, a display area to be displayed in accordance with an operation log of each user in a past event, so that a different display screen is available to be displayed for each user when the event is resumed. For example, a screen desired by a user is displayed on the display apparatus 10 used by the user when an event is resumed. This allows each user to get the picture of the event in the past when the user views the display screen at a time of resuming the event, resulting in resuming the event smoothly.

Functional Configuration:

Referring to FIG. 7 to FIG. 11, a functional configuration of the data sharing system 1 is described according to the present embodiment. FIG. 7 is a diagram illustrating an example of a functional configuration of the data sharing system 1. FIG. 7 illustrates a part of apparatuses and terminals of FIG. 1, which are related to processing or operation described below.

Functional Configuration of Display Apparatus:

Referring to FIG. 7, functional configurations of the display apparatus 10A and the display apparatus 10B. Since the display apparatus 10A and the display apparatus 10B have the same or substantially the same functions, the functions of the display apparatus 10 are described below. The display apparatus 10 includes a transmission/reception unit 11, a reception unit 12, a display control unit 13, a determination unit 14, a sharing area generation unit 15, a screen data creation unit 16, a thumbnail image generation unit 17, a sharing area restoration unit 18, a possible area generation unit 19, a setting unit 21, an area image generation unit 22, an external device communication unit 23, and a storing/reading unit 29. These units are functions that are implemented by or that are caused to function by operating any of the hardware elements illustrated in FIG. 3 or FIG. 4 in cooperation with the instructions of the CPU 201 according to the control program expanded from the SSD 204 to the RAM 203 or the instruction of the CPU 301 according to the control program expanded from the HD 304 to the RAM 303. The display apparatus 10 further includes a storage unit 1000 that is implemented by the ROM 202, the SSD 204, or the USB memory 230 illustrated in FIG. 3, or the ROM 302, the HD 304, or the storage medium 321 illustrated in FIG. 4.

The transmission/reception unit 11 is mainly implemented by the network I/F 205 that operates according to instructions of the CPU 201, or the network I/F 308 that operates according to instructions of the CPU 301. The transmission/reception unit 11 transmits or receives various data or information to or from other apparatuses or terminals through the communication network 5.

The reception unit 12 is mainly implemented by the contact sensor 214 and the electronic pen controller 216 that operate according to instructions of CPU 201, or the pointing device 312 or the touch panel 309 that operates according to instructions of the CPU 301. The reception unit 12 receives various inputs from a user.

The display control unit 13 is mainly implemented by the display controller 213 that operates according to instructions of the CPU 201, or instructions of the CPU 301. The display control unit 13 controls the display 280 or the display 306 to display a drawn-image, or to access the communication management apparatus 50 using a web browser or the like to display various screen data. Specifically, the display control unit 13 activates and executes various applications that operate on an operating system (OS), to control the display 280 or the display 306 to display various screens drawn by an application programming interface (API) provided by the OS.

The determination unit 14, which is implemented by instructions of the CPU 201 or the CPU 301, performs various determinations. The sharing area generation unit 15 is mainly implemented by instructions of the CPU 201 or the CPU 301 and generates the sharing area that is displayed as being shared with the other display apparatuses 10.

The screen data generation unit 16 is mainly implemented by instructions of the CPU 201 or the CPU 301 and generates screen data of the sharing area. The screen data generation unit 16 generates the object data and an image of an object based on a handwriting input received by the reception unit 12. Further, the screen data generation unit 16 generates an image of an object based on the object data received by the transmission/reception unit 11. The screen data generation unit 16 converts an object obtained by, for example, a handwriting input on the display by a user into coordinate data. For example, when the display apparatus 10 at a certain site transmits coordinate data to the display apparatuses 10 at other sites, each of the display apparatuses 10 at other sites displays an object of the same content on the own display based on the coordinate data. Further, the screen data generation unit 16 generates metadata relating to a display log of the display screen. The metadata and the object data generated by the screen data generation unit 16 are examples of log data indicating a conduct history of conducted events.

The thumbnail image generation unit 17 is mainly implemented by instructions of the CPU 201 or the CPU 301 and generates a thumbnail image of a display screen displayed in an event executed.

The shared area restoration unit 18 is mainly implemented by instructions of the CPU 201 or the CPU 301 and restores a shared area generated in a past event based on the screen data received by the transmission/reception unit 11.

The possible area generation unit 19 is mainly implemented by instruction of the CPU 201 or the CPU 301 and generates possible display areas to be displayed on the display screen among areas included in the sharing area.

The setting unit 21 is mainly implemented by instructions of the CPU 201 or the CPU 301, and sets a display area to be displayed on the display screen.

The area image generation unit 22 is mainly implemented by instructions of the CPU 201 or the CPU 301 and generates an area image that is an image of the display area set by the setting unit 21.

The external device communication unit 23 is mainly implemented by the external device connection I/F 206 that operates according to instructions of the CPU 201, or the external device connection I/F 307 that operates according to instructions of the CPU 301. The external device communication unit 23 receives input of various data or information from the external device connected to the display apparatus 10.

The storing/reading unit 29, which is implemented by instructions of the CPU 201 or the CPU 301, stores various data or information in the storage unit 1000 or reads out various data or information from the storage unit 1000.

Functional Configuration of Communication Management Apparatus:

Referring to FIG. 7, a functional configuration of the communication management apparatus 50 is described according to the present embodiment. The communication management apparatus 50 includes a transmission/reception unit 51, an authentication unit 52, an event history generation unit 53, a sharing area generation unit 54, an event history management unit 55, a thumbnail image generation unit 56, and a storing/reading unit 59. These units are functions that are implemented by or that are caused to function by operating any of the hardware elements illustrated in FIG. 5 in cooperation with the instructions of the CPU 501 according to the control program for the communication management apparatus, the control program being expanded from the HD 504 to the RAM 503. The communication management apparatus 50 further includes a storage unit 5000 that is implemented by the ROM 502, the HD 504, or the storage medium 515 illustrated in FIG. 5.

The transmission/reception unit 51 is mainly implemented by the network I/F 509 that operates according to instructions of the CPU 501. The transmission/reception unit 51 transmits or receives various data or information to or from other apparatuses or terminals through the communication network 5.

The authentication unit 52 is implemented by instructions of the CPU 501 and performs authentication processing of a user who participates in an event using the display apparatus 10.

The event history generation unit 53 is mainly implemented by instructions of the CPU 501 and generates event history information indicating a record of events carried out (executed) by the user.

The sharing area generation unit 54 is mainly implemented by instructions of the CPU 501 and generates the sharing area that is displayed as being shared by the plurality of display apparatuses 10.

The event history management unit 55 is mainly implemented by instructions of the CPU 501 and manages the event history generated by the event history generation unit 53.

The thumbnail image generation unit 56 is mainly implemented by instructions of the CPU 501 and generates a thumbnail image of a display screen displayed in an event executed.

The storing/reading unit 59 is implemented by instructions of the CPU 501 and stores various data or information in the storage unit 5000 or reads out various data or information from the storage unit 5000.

User Information Management Table:

FIG. 8 is a conceptual diagram illustrating an example of a user information management table, according to the present embodiment. The user information management table stores user information identifying users who participate in an event. In the storage unit 5000, a user information management database (DB) 5001 is stored, for example, in the form of the user information management table as illustrated in FIG. 8. The user information management table stores the user information associating a user ID identifying a user, a user name, a password, and an e-mail address with each other. The e-mail address is an example of destination information indicating a user destination. The user ID and the user name are examples of identification information for identifying a user. The user information may include at least one of the user ID and the user name.

Event History Management Table:

FIG. 9 is a conceptual diagram illustrating an example of the event history management table. The event history management table manages a record of events executed with the display apparatus 10. In the storage unit 5000, an event history management DB 5002 is stored, for example, in the form of the event history management table as illustrated in FIG. 9. The event history management table includes a record of the event history information in which an event ID identifying an event, an event name, an event date/time when the event is executed, a participating user who participated in the event, and a file storage location where an event file generated in the event is stored in association with each other.

The event date/time indicates, for example, the date and time when the event file was updated most recently. In another example, the event date/time indicates the date and time when the corresponding event is first conducted. In still another example, the start date/time and the end date/time of the event are be stored. The participating user indicates a user ID of a user who has participates in the event. The participating user may be indicated by a user name of a user who has participated in the event. Further, the file storage location indicates information of a storage destination in which various event files are stored. For example, the file storage location is a data path in the communication management apparatus 50. In another example, the file storage location is a uniform resource locator (URL) or a uniform resource identifier (URI) external to the communication management apparatus 50. Example of the event file stored in the file storage location includes, but are not limited to, a metadata file 500, an object data file 550, and sharing area data of an event generated by the sharing area generation unit 54.

Metadata File:

FIG. 10 is a view of an example of the metadata file 500 according to the present embodiment. The metadata file 500 illustrated in FIG. 10 is an event file generated in an event previously executed. The metadata file 500 indicates, as metadata, a log of operations (operation log) performed on the display screen, such as an operation of moving, enlarging, or reducing the display screen, for each user. The metadata file 500 illustrated in FIG. 10 includes an event name ("Name") a start time ("Start") and an end time ("End") of an event, and an operation log ("OperationLog") for each user. The operation log includes, as a display area ("ViewArea") for each user, area information indicating a coordinate position ("X, Y") and a size ("Width, Height") of the display area, and display log data indicating a display time ("Time").

The example illustrated in FIG. 10 indicates that an event named "Theme A, Regular Meeting 1" was executed from "2021/01/15, 13:00" to "2021/01/15, 15:00." Further, the example of FIG. 10 indicates that the display apparatus 10 used by a participant "Taro" first displays an area whose upper left corner is at (X, Y)=(10, 310) of the sharing area and having a width of 100 pixels and a height of 80 pixels for 100 seconds, and the displayed area moves to an area whose upper left corner is (X, Y)=(100, 210) according to an operation by "Taro." Moreover, the example of FIG. 10 indicates that an area last displayed by the display apparatus 10 used by "Taro" whose user ID is "A001" is an area of (X, Y)=(130, 1300). Moreover, the example of FIG. 10 indicates that an area last displayed by the display apparatus 10 used by "Saburo" whose user ID is "A003" is an area of (X, Y)=(105, 1200).

The metadata file 500 includes such an operation log for each user. Although FIG. 11 illustrates an example in which a data format of the metadata file 500 is a JavaScript Object Notation (Json) format, the metadata file 500 is in any other data format.

Object Data File:

FIG. 11 is a view of an example of the object data file 550 according to the present embodiment. The object data file 550 illustrated in FIG. 11 is an event file generated in an event previously executed. The object data file 550 indicates, as object data, an operation log of handwriting input objects such as a stroke or a stamp. The object data file 550 illustrated in FIG. 11 includes a background color ("BackgroundColor") of the sharing area and object data ("Objects") indicating an input log of objects representing handwriting inputs. The object data includes an object type ("Type"), detailed data information ("Data:) indicating content of an object, a user ID ("User") identifying a user who has input the object, and a date/time ("Date") when the object has been input. Examples of the object type include, but are not limited to, a stroke and a stamp. When the object type is a stroke, for example, the detailed data information includes data of a trajectory ("Points") of coordinate positions of the stroke, a line thickness ("Thin"), and a line color ("Color"). When the object type is a stamp, for example, the detailed data information includes data of a coordinate position ("Points"), a size ("Size"), and an image file ("Image") of the stamp.

The example illustrated in FIG. 11 indicates that the user "Taro" whose user ID is "A001" inputs, to the sharing area having a background color (BackgroundColor) of white, a black stroke having a thickness of five pixels from the coordinates (X, Y)=(10, 10) to (X, Y)=(30, 30) at "2021/01/15, 13:32." The example of FIG. 11 further indicates that, after the above input of the stroke, the user "Saburo" whose user ID is "A003" inputs an image file "Circle. jpg" having a size of 20 pixels×20 pixels at a position with coordinates (X, Y)=(100, 200) as the left upper corner at "2021/01/15, 13:40." The object data file 550 stores such object data for each object that is input. Although FIG. 11 illustrates an example in which a data format of the object data file 550 is a Json format, the object data file 550 is in any other data format. The stroke and the stamp merely examples of the object type. In another example, the object type includes texts obtained by applying optical character reader (OCR) processing to strokes representing symbols such as characters or numbers, system-generated characters such as date or time, certain figures such as triangles, stars or circles, or lines such as arrows, line segments, or Bezier curves.

Figure 12:
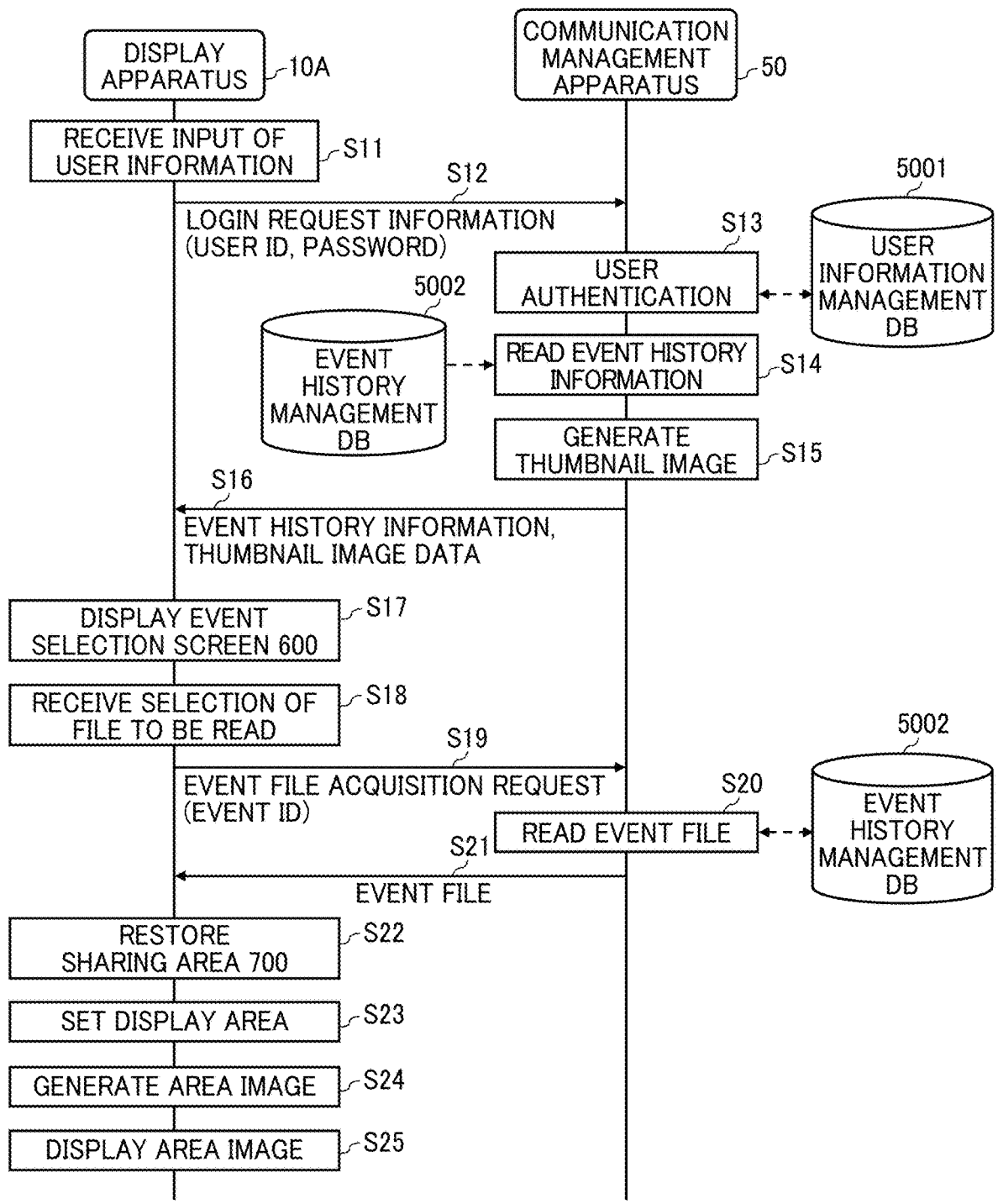
FIG. 12 is a sequence diagram illustrating an example of operation of displaying a screen at a time of resuming an event, according to an embodiment of the present disclosure.
Figure 15:
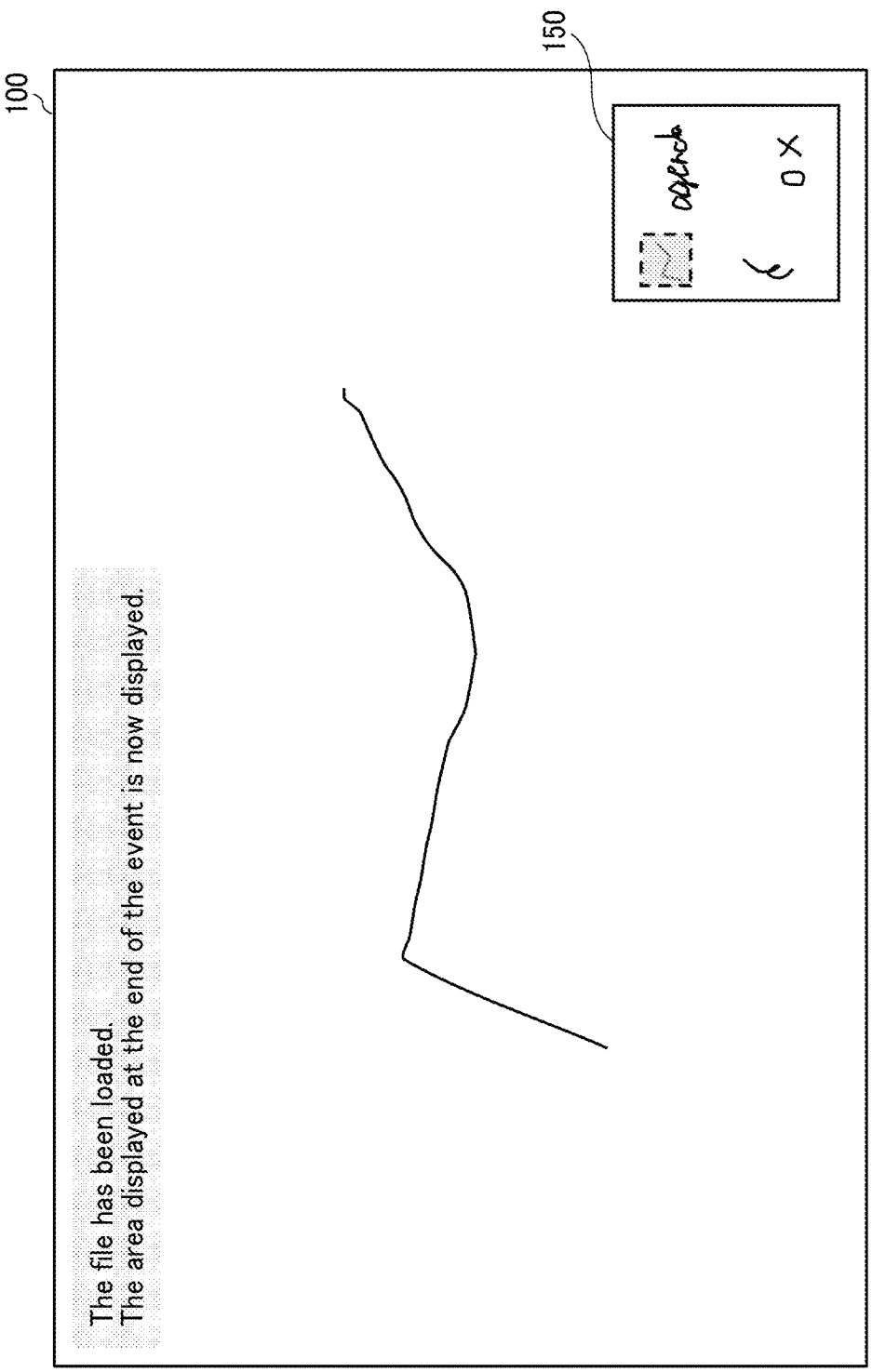
FIG. 15 is an illustration of an example of a display screen, according to an embodiment of the present disclosure.
Figure 16:
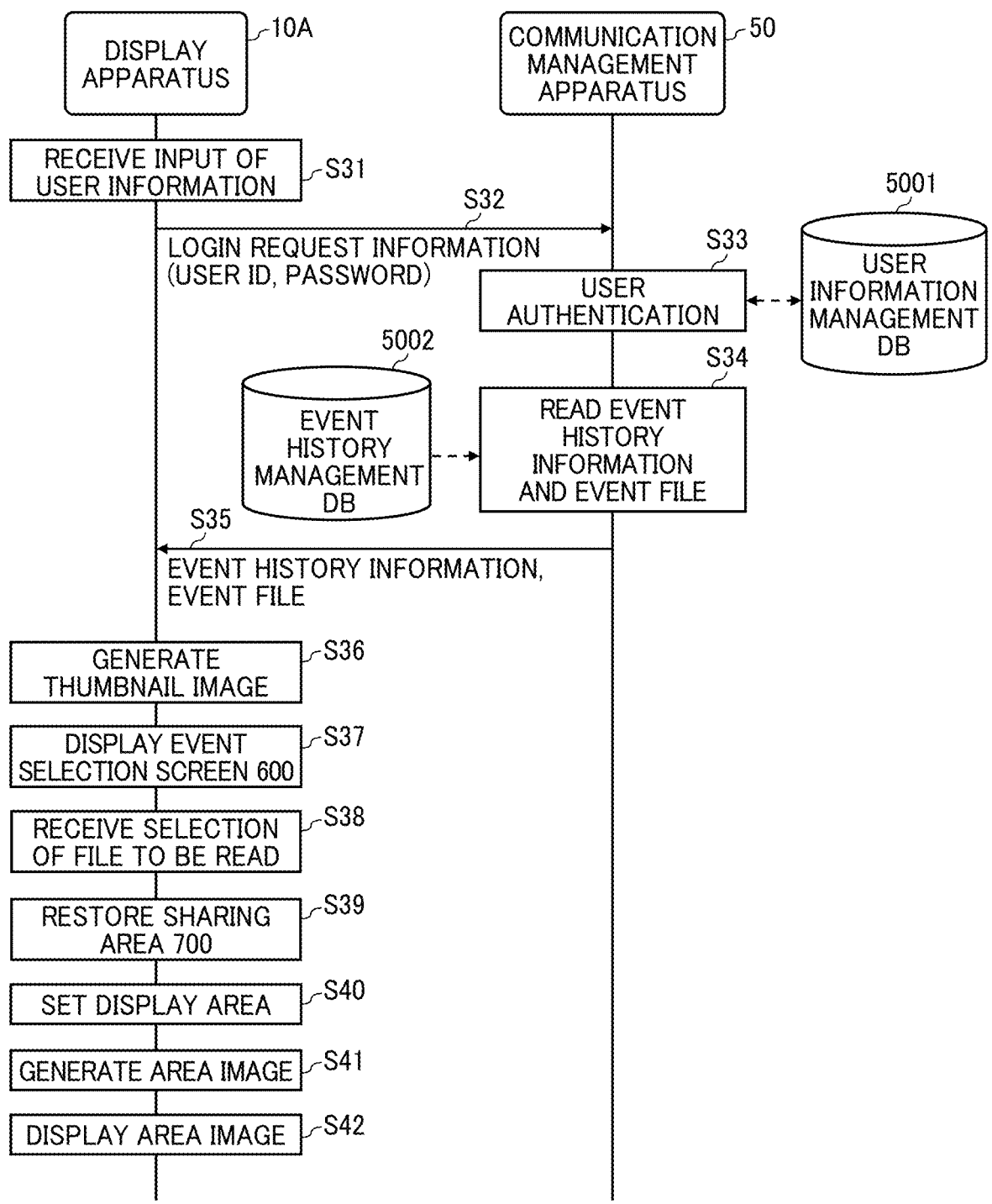
FIG. 16 is a sequence diagram illustrating another example of operation of displaying a screen at a time of resuming an event, according to an embodiment of the present disclosure.

Processes or Operation:

Process of Resuming Event:

Referring to FIG. 12 to FIG. 27, processes and operations performed by the data sharing system 1 according to the present embodiment are described. The following description is provided of an example of an operation performed by the display apparatus 10A used by the user A. The same or substantially the same operation is performed by the display apparatus 10B used by the user B illustrated in FIG. 1. Referring to FIG. 12 and FIG. 16, a display screen displayed on the display apparatus 10 when an event executed in the past is resumed. FIG. 12 is a sequence diagram illustrating an example of operation of displaying a screen at a time of resuming an event.

First, in response to an operation performed by the user A with the input device of the display apparatus 10A, the reception unit 12A of the display apparatus 10A receives an input of user information including a user ID and a password (step S11). Next, the transmission/reception unit 11A transmits login request information to the communication management apparatus 50 (step S12). The login request information includes the user ID and the password received in step S11. The transmission/reception unit 51 of the communication management apparatus 50 receives the login request information transmitted from the display apparatus 10A.

Next, the authentication unit 52 of the communication management apparatus 50 performs user authentication using the user ID and the password received in step S12 (step S13). Specifically, the storing/reading unit 59 searches the user information management DB 5001 (see FIG. 8) using a set of the user ID and the password received in step S12 as a search key, to determine whether the same set of the user ID and the password is stored. When the same set of the user ID and the password is stored, the authentication unit 52 determines that the user A who has sent the login request is an authorized user. When the same set of the user ID and the password is not stored, the authentication unit 52 determines that the user A who has sent the login request is not authorized (unauthorized) user. When the user A is an unauthorized user, the transmission/reception unit 51 transmits, to the display apparatus 10A, a notification indicating that the user A is an unauthorized user. In the following, an example in which the user A is an authorized user is described. Although the user ID input by the user is used in the authentication processing of steps S11 to S13, a user name may be received in step S11, and the authentication unit 52 may perform the authentication processing by using the user name.

Next, the event history management unit 55 searches the event history management DB 5002 (see FIG. 9) using the user identification information such as the user ID of the user A authenticated in the step S13 as a search key, thereby reading out the event history information of the events in which the user A has participated via the storing/reading unit 59 (step S14). The event history information includes an event ID associated with the user A as a participating user, an event name, an event date/time when the event is held, participating users, and a storage location of event file. In addition, the thumbnail image generation unit 56 refers to the event history information read in step S14 and generates a thumbnail image for each event (step S15). Specifically, the thumbnail image generation unit 56 accesses each storage location of event file included in the event history information, and generates the thumbnail image of a screen displayed at the end of the event with the display apparatus 10A used by the user A in each event based on the metadata file 500 and the object data file.

Next, the transmission/reception unit 51 transmits the event history information read in step S14 and the thumbnail image generated in step S15 to the display apparatus 10A (step S16). The event history information includes at least an event ID, an event name, an event date/time, and user identification information for identifying each participating user. The transmission/reception unit 11A of the display apparatus 10A receives the event history information and the thumbnail image transmitted from the communication management apparatus 50.

Figure 13:
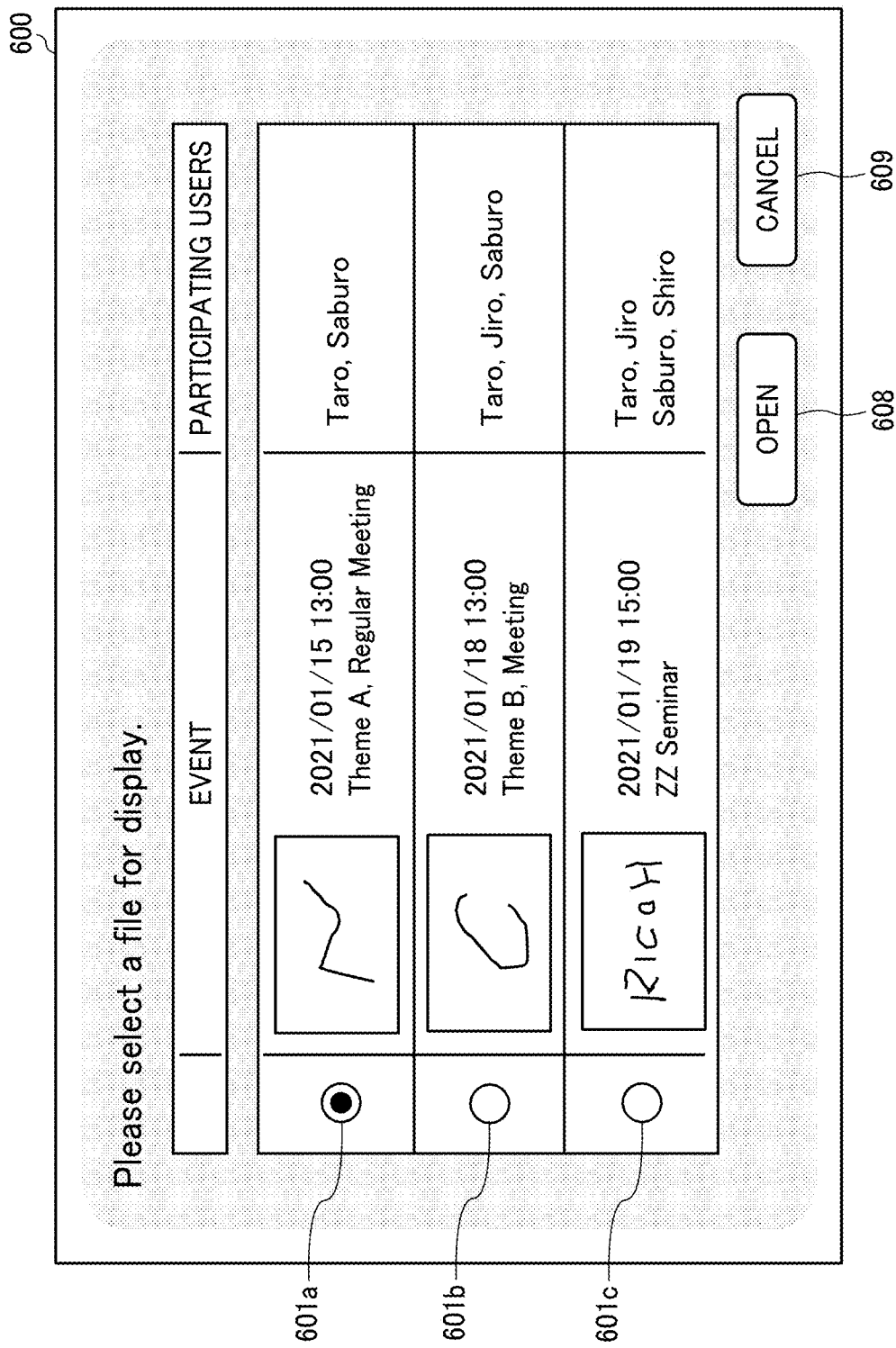
FIG. 13 is a diagram illustrating an example of an event selection screen, according to an embodiment of the present disclosure.

The display control unit 13A of the display apparatus 10A causes a display unit (for example, the display 280 or the display 306) to display an event selection screen 600 for allowing the user to select an event to be executed (step S17). FIG. 13 is a diagram illustrating an example of the event selection screen 600. The event selection screen 600 illustrated in FIG. 13 displays a list of events in which the user A participated in the past. The event selection screen 600 includes event information generated based on the event history information and the thumbnail image data received in step S16. In addition, the event selection screen 600 includes selection buttons 601 (601*a*, 601*b*, 601*c*) each of which is for selecting a corresponding event, an "OPEN" button 608 that is pressed to open an event file corresponding to a selected event, and a "CANCEL" button 609 that is pressed to end the selection of the event. The user A selects an event to be resumed by checking the event history information such as the event date/time, the event name, and the participating users and the thumbnail image of the event displayed on the event selection screen 600.

Next, when the user A selects the selection button 601 and presses the "OPEN" button 608, the reception unit 12A of the display apparatus 10A receives the selection for reading a corresponding file that is an event file to be read (step S18). FIG. 13 is an illustration of an example of a sharing area in a case where the user A selects an event having an event ID "G001" corresponding to the selection button 601*a*. Then, the transmission/reception unit 11A transmits to the communication management apparatus 50 an event file acquisition request indicating that acquisition of the event file is requested (step S19). The event file acquisition request includes an event ID for identifying the event selected in step S18. The transmission/reception unit 51 of the communication management apparatus 50 receives the event file acquisition request transmitted from the display apparatus 10A.

The event history management unit 55 of the communication management apparatus 50 searches the event history management DB 5002 using the event ID received in the step S19 as a search key, thereby reading a storage location of the file associated with an event ID that is same as the received event ID via the storing/reading unit 59. Then, the event history management unit 55 reads the event file stored in the storage location of the read file via the storing/reading unit 59 (step S20).

Next, the transmission/reception unit 51 transmits the event file read in step S20 to the display apparatus 10A (step S21). The transmission/reception unit 11A of the display apparatus 10A receives the event file transmitted from the communication management apparatus 50.

Figure 14:
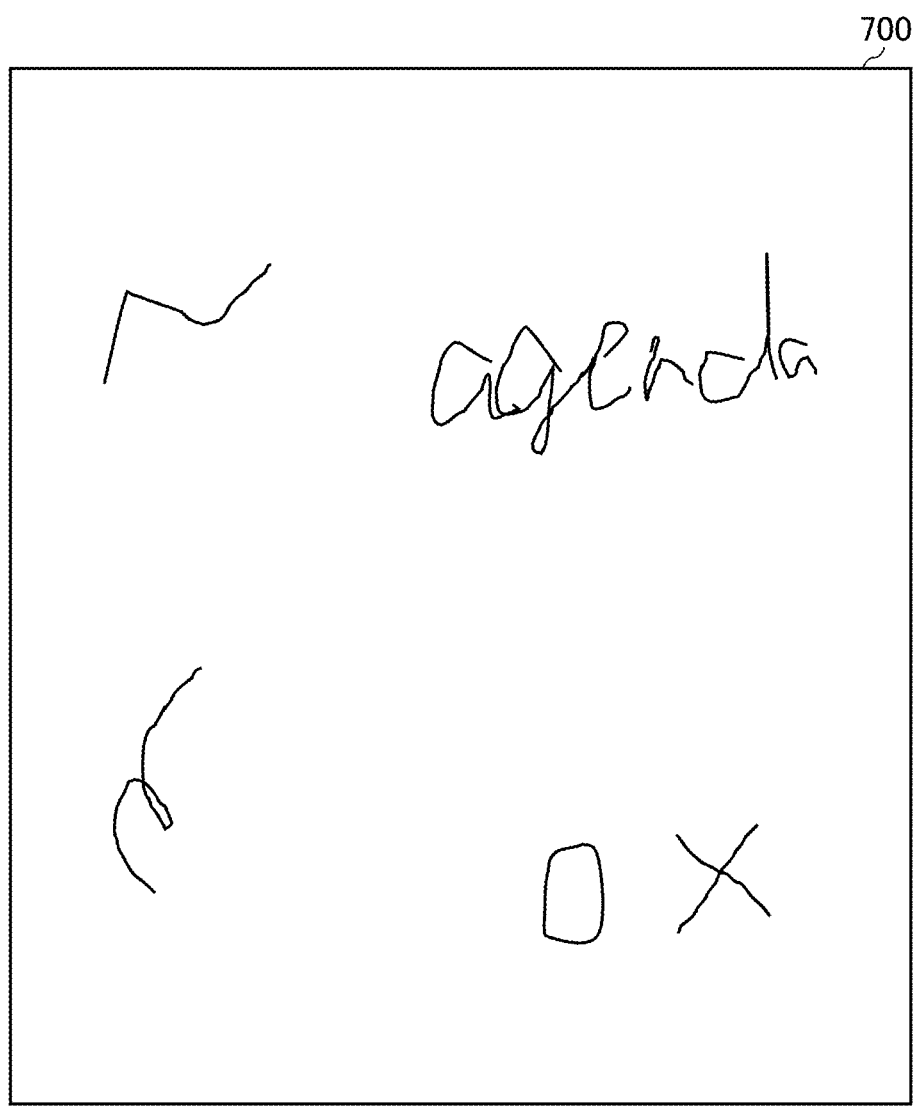
FIG. 14 is an illustration of an example of a sharing area, according to an embodiment of the present disclosure.

The sharing area restoration unit 18A of the display apparatus 10A uses the event file received in step S21 to restore a sharing area 700 shared with other display apparatuses 10 (for example, the display apparatus 10B) (step S22). FIG. 14 is an illustration of an example of the sharing area 700. The sharing area 700 illustrated in FIG. 14 is a handwriting input screen that is displayed as being shared with one or more other display apparatuses 10 in the event, which is held in the past. The sharing area restoration unit 18A restores the image of the objects input to the sharing area 700 by using the object data file 550 corresponding to the received event file.

Next, the setting unit 21A of the display apparatus 10A sets a display area that is at least a part of the sharing area 700 restored in step S22 (step S23). For example, the setting unit 21A uses the metadata file 500, which is corresponding to the event file received in the step S21, to set, as the display area, an area that is displayed at the end of the previous event with the display apparatus 10A used by the user A. For example, the setting unit 21A sets the display area based on area information indicating a coordinate position and a size indicated in the metadata file 500. The display apparatus 10A sets the area displayed at the end of the previous event to the display area, and this allows the user A to immediately remember where and what was written in the previous event.

Next, the area image generation unit 22A generates an area image of the display area set in step S23 (step S24). Then, the display control unit 13A causes the display unit (for example, the display 280 or the display 306) to display the area image generated in step S24 (step S25). FIG. 15 is an illustration of an example of a display screen, according to the present embodiment. A display screen 100 illustrated in FIG. 15 displays the area image generated in the step S24. The display screen 100 includes a panoramic screen 150 indicating the sharing area 700 in a reduced manner in addition to the area image. In the panoramic screen 150, a position and size corresponding to the area image being displayed on the display screen 100 in the sharing area 700 is highlighted so as to be identifiable by the user easily.

In this manner, the display apparatus 10 reproduces the display screen that was displayed at the end of the previous event when the event is resumed, and this allows the user to quickly get the picture of the event or understand the content of the event held in the past. In addition, the display apparatus 10 displays the position of the area being displayed on the display screen 100 with respect to the entire sharing area 700 using the panoramic screen 150, thereby allowing the user to easily understand the content of the event.

Referring to FIG. 16, still another example of processing at the time of resuming an event, which is executed in the past. FIG. 16 is a sequence diagram illustrating an example of operation of displaying a screen at a time of resuming an event. In the example of FIG. 16, the display apparatus 10A generates a thumbnail image of a display screen. Processing from step S31 to step S33 is performed in the same or substantially the same manner as the processing from step S11 to step S13 described above with reference to FIG. 12, and thus redundant descriptions thereof are omitted below.

In step S34, the event history management unit 55 of the communication management apparatus 50 searches the event history management DB 5002 (see FIG. 9) using the user identification information such as the user ID of the user A authenticated in the step S33 as a search key, thereby reading out the event history information of the events in which the user A has participated via the storing/reading unit 59. The event history information includes an event ID associated with the user A as a participating user, an event name, an event date/time when the event is held, participating users, and a storage location of event file. The event history management unit 55 further accesses the storage location of the event file. The storage location is stored in the event history information read via the storing/reading unit 59.

Next, the transmission/reception unit 51 transmits the event history information and the event file read in step S34 to the display apparatus 10A (step S35). The event history information includes at least an event ID, an event name, an event date/time, and user identification information for identifying each participating user. The transmission/reception unit 11A of the display apparatus 10A receives the event file transmitted from the communication management apparatus 50.

Next, the thumbnail image generation unit 17A of the display apparatus 10A generates a thumbnail image of a screen that is previously displayed at the end of the event by the user A based on the operation log indicated by the event file received in step S35 (step S36). The history data related to the operation log is specified by the metadata file 500 and the object data file 550 included in the event file.

The display control unit 13A causes the display unit (for example, the display 280 or the display 306) to display the event selection screen 600 (see FIG. 13) for allowing the user to select an event to be executed (step S37). The event selection screen 600 indicates the event history information received in step S35 and the event history indicating the thumbnail images generated in step 36.

Next, when the user A selects the selection button 601 and presses the "OPEN" button 608, the reception unit 12A of the display apparatus 10A receives the selection for reading a corresponding file that is an event file to be read (step S38). The sharing area restoration unit 18A uses the event file corresponding to the read file, which is selected in step S38 to restore the sharing area 700, which is shared with the other display apparatuses 10 (for example, the display apparatus 10B) (step S39). Processing from step S40 to step S42 is performed in the same or substantially the same manner as the processing from step S23 to step S25 described above with reference to FIG. 12, and thus redundant descriptions thereof are omitted below.

Figure 17:
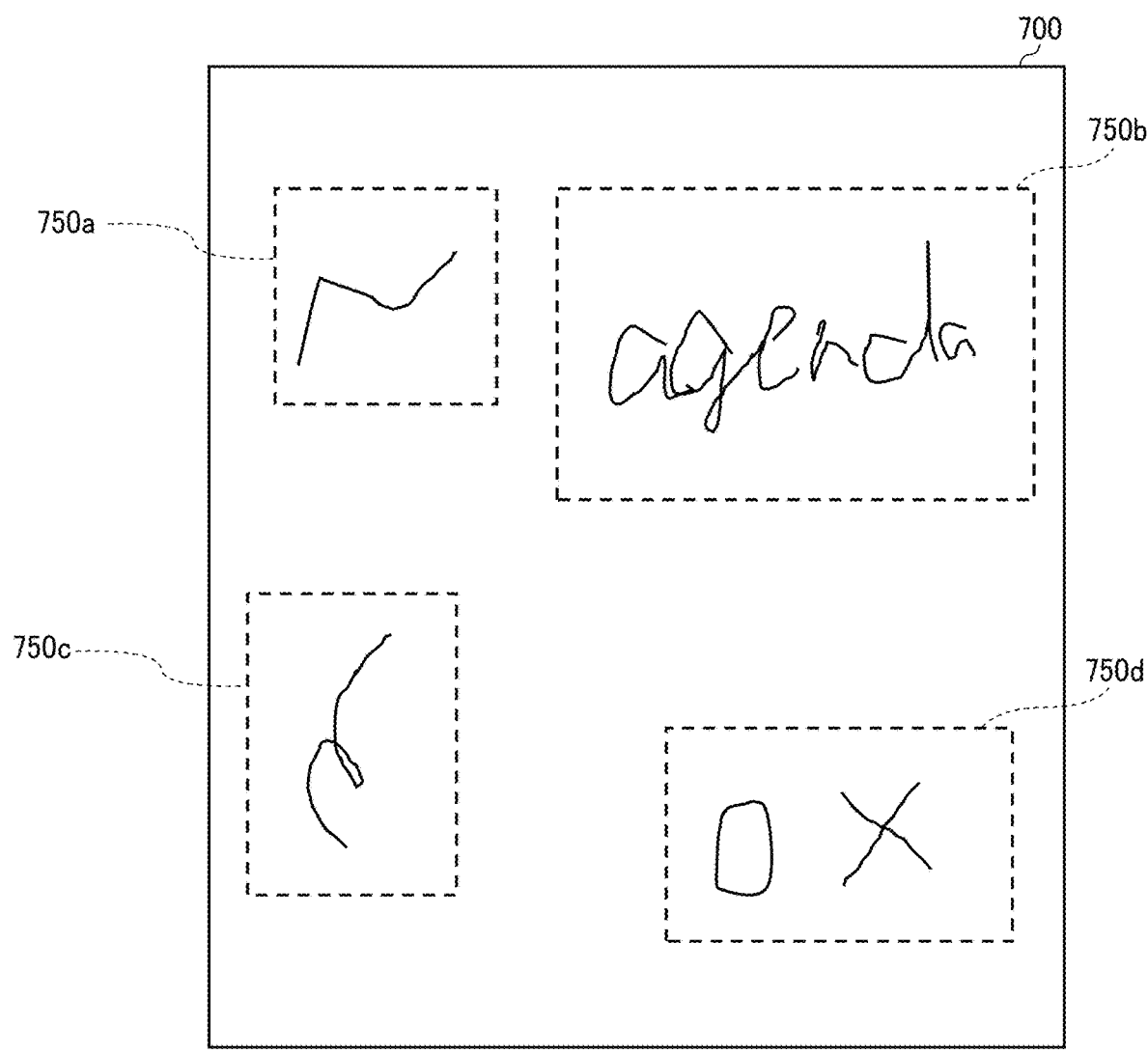
FIG. 17 is an illustration for describing an example of a display area in a sharing area, according to an embodiment of the present disclosure.

Selection of Display Area:

Next, a process of selecting a display area to be displayed on the display screen 100 when an event is resumed is described with reference to FIGS. 17 to 20. FIG. 17 is an illustration for describing an example of a display area in the sharing area. As illustrated in FIG. 17, since the sharing area 700 is larger than a display area of the display screen of the display apparatus 10, at least a part (for example, one of areas 750a to 750d) of the sharing area 700 is to be displayed as the display area on the display screen 100. In the event, the display apparatus 10 displays an area of the sharing area 700 according to an input operation performed by the user, and the user performs handwriting input and browsing of the object, accordingly.

Figure 18:
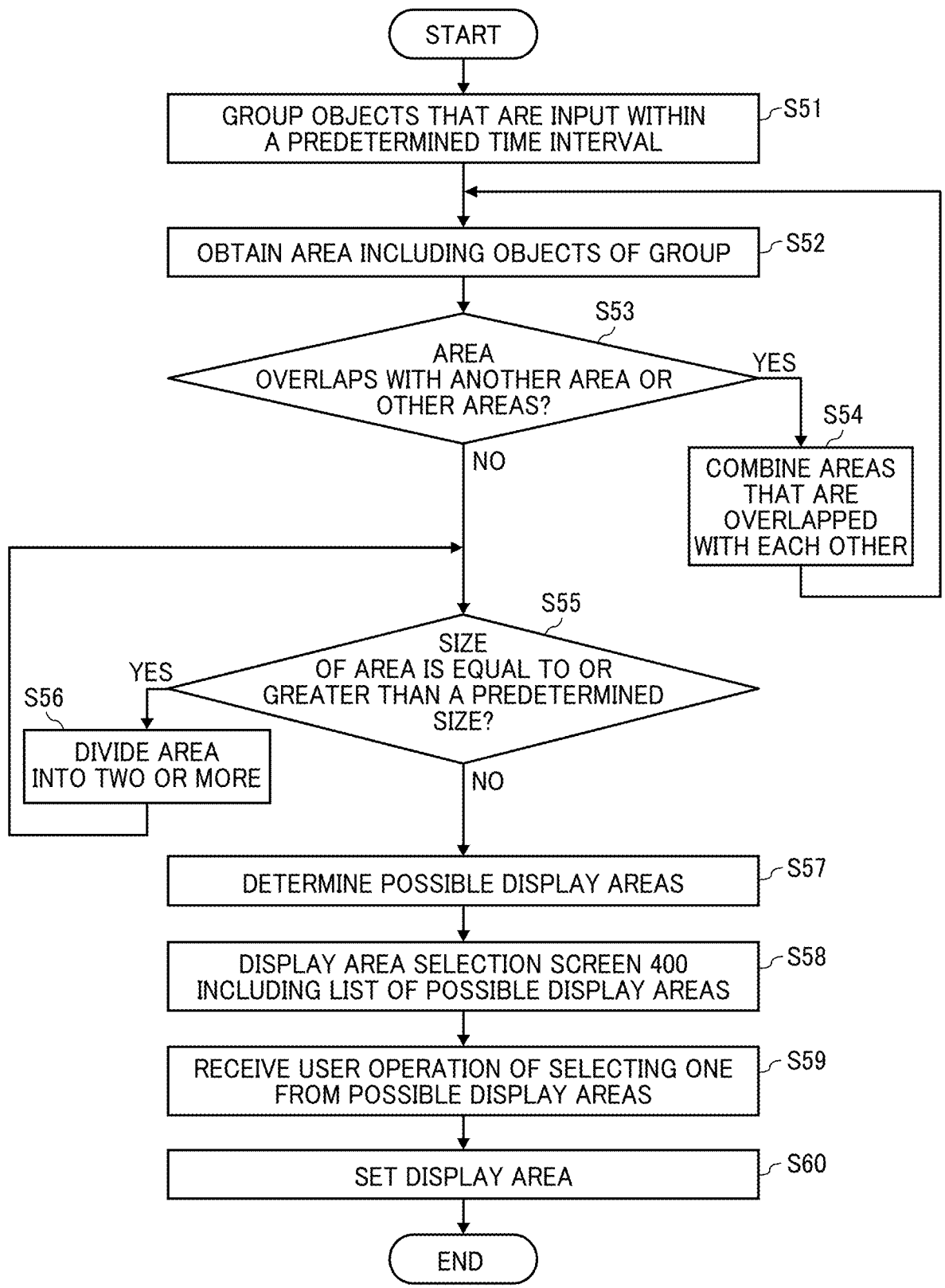
FIG. 18 is a flowchart illustrating an example of display area setting processing performed by a display apparatus according to an embodiment of the present disclosure.

Referring to FIG. 18, a description is given below of processing of setting the display area corresponding to step S23 of FIG. 12 and step S40 of FIG. 16 by selecting one among from a plurality of possible areas that is a plurality of selectable areas each may be the display area. FIG. 18 is a flowchart illustrating an example of display area setting processing performed by the display apparatus.

First, the setting unit 21A groups objects input within a predetermined time interval based on the object data file 550 included in the event file received by the transmission/reception unit 11A (step S51). The predetermined time interval may be set by a user or a designer. For example, using the input time (Date) indicated in the object data file 550, the setting unit 21A regards objects input within a predetermined time interval close to the input time as an image desired to be displayed on a screen by the user A and groups the object as a group.

Next, the setting unit 21A calculates an area including all the objects in each group (step S52). The setting unit 21A calculates area information of each area including all objects in each group made in the step SM. The area information includes a coordinate position ((X, Y)) and a size (width, height) of the area. When the area calculated by the setting unit 21A in step S53 overlaps with another area (YES in step S52), the process proceeds to step S54. Then, the setting unit 21A combines groups of overlapping areas (step S54), and repeats the processing from step S52. On the other hand, when the area calculated in step S53 does not overlap with another area (NO in step S52), the setting unit 21A performs the processing of step S55. As described above, when the areas corresponding to the groups overlap each other, the setting unit 21A can regard the overlapping areas as images to be simultaneously displayed on one screen, and thus the setting unit 21 combines the overlapping areas and regards the combined areas as one group.

Next, when there is an area having a size equal to or greater than a predetermined size among the areas calculated in step 21A (YES in step S52), the setting unit S55 performs the processing to step S56. The predetermined size may be set by a user or a designer. Then, the setting unit 21A divides an area having a size equal to or greater than the predetermined size (step S56). On the other hand, in a case where there is no area having a size equal to or larger than the predetermined size among the areas calculated in step 21A (NO in step S52), the setting unit S55 performs the processing to step S57. As described above, when there is no area overlaps with another area in relation to the groups and there is no area having a size equal to or greater than the predetermined size, the setting unit 21A extracts possible groups each corresponding to an area that may be displayed at the time of resuming the event.

Next, the setting unit 21A determines an area to be a possible display area among the areas calculated in step S52 (step S57). Examples of the possible display area (possible area) include, in a case of the display apparatus A used by the user A, an area that is displayed at the end of the last event by the user A, an area that is displayed for the longest period of time by the user A in the previous event, an area that includes the largest number of objects input in the previous event (having the highest density), and a whole area including all objects input in the past event.

For example, the setting unit 21A determines an area as the area that is displayed at the end of the previous event based on the operation log of the received metadata file 500. For example, the setting unit 21A determines an area as the area that is displayed for the longest period of time based on information on display time included in the received display history of the metadata file 500. The area displayed for the longest period in the event means, in other words, the area displayed longer than the other areas in the sharing area in the event. For example, the setting unit 21A determines an area as the area that includes the largest number of input objects based on the area information included in the received object data file 550 and the received display history file 500. For example, the area that includes the largest number of input objects is, for example, an area in which the number of input objects is the largest and a density of objects is the highest based on the number of objects and an area (size) of the area. The area that includes the largest number of input objects may be referred to as an area having the highest density. In addition, the setting unit 21A determines an area including all the input objects as whole area based on the area information included in the received object data file 550 and the received metadata file 500.

The area to be a possible display area determined by the setting unit 21A is not limited thereto, and may include, for example, an area in which an object is input last time to be changed in the previous event. In this case, the setting unit 21A determines, as the area in which an object is input last time, an area including an object having the latest input date and time based on the received object data file 550.

Figure 19:
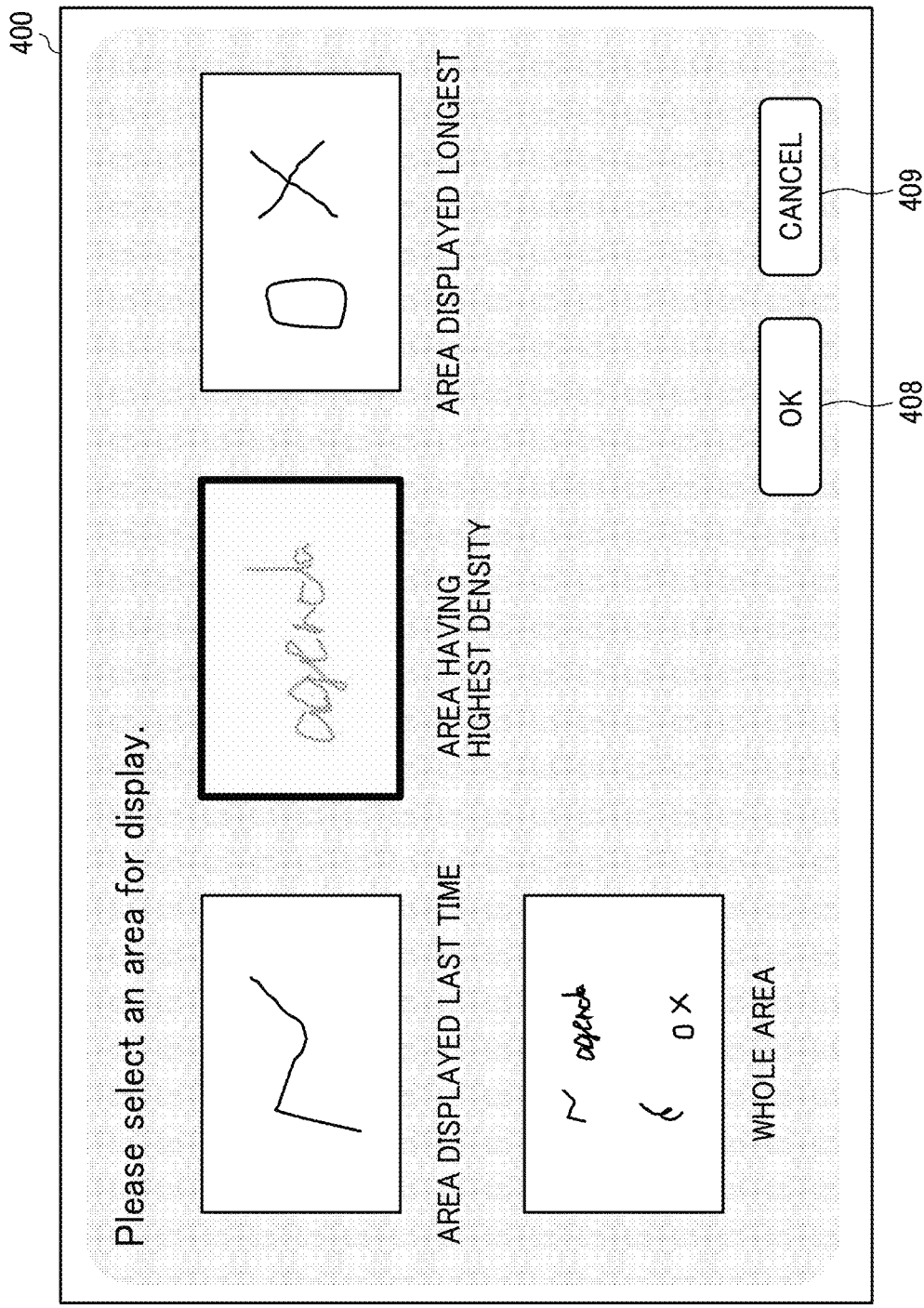
FIG. 19 is a diagram illustrating an example of a display area selection screen, according to an embodiment of the present disclosure.

Next, the display control unit 13A causes the display unit (for example, the display 280 or the display 306) to display a possible area selection screen 400 indicating a list of possible areas determined in step S57 (step S58). FIG. 19 is a diagram illustrating an example of the display area selection screen 400. The possible area selection screen 400 illustrated in FIG. 19 includes a list of images each of which is corresponding to a possible area determined in step 57. The possible area selection screen 400 includes an "OK" button 408 that is pressed when a selected possible area is set as the display area, and a "CANCEL" button that is pressed when the area selection process is canceled. As described in step S57, the possible display areas on the display area selection screen 400 is determined based on, for example, the operation log of the user included in the metadata file 500 and the object data file 550. Among the possible display areas illustrated in FIG. 19, the area that is displayed at the end of the last event and the area that is displayed for the longest period of time vary for each user.

Next, when the user A selects a possible area from the list and presses the "OK" button 408, the reception unit 12A receives the user operation of selecting the possible area (step S59). In the example of FIG. 19, the user A selects a possible area corresponding to the "AREA HAVING HIGHEST DENSITY" Then, the setting unit 21A sets the possible area selected in step S59 as the display area (step S60). Then, the display apparatus 10A generates an area image of the set display area and displays the generated area image on the display screen 100 as illustrated in step S41 and step S42 of FIG. 16.

As described above, the display apparatus 10 presents, to each user, the possible display areas that may be displayed when the event is resumed based on the operation log of the corresponding user in the past event of the user, thereby allowing the user to select an optimum area with which the user get the picture of the event executed in the past easily.

Figure 20:
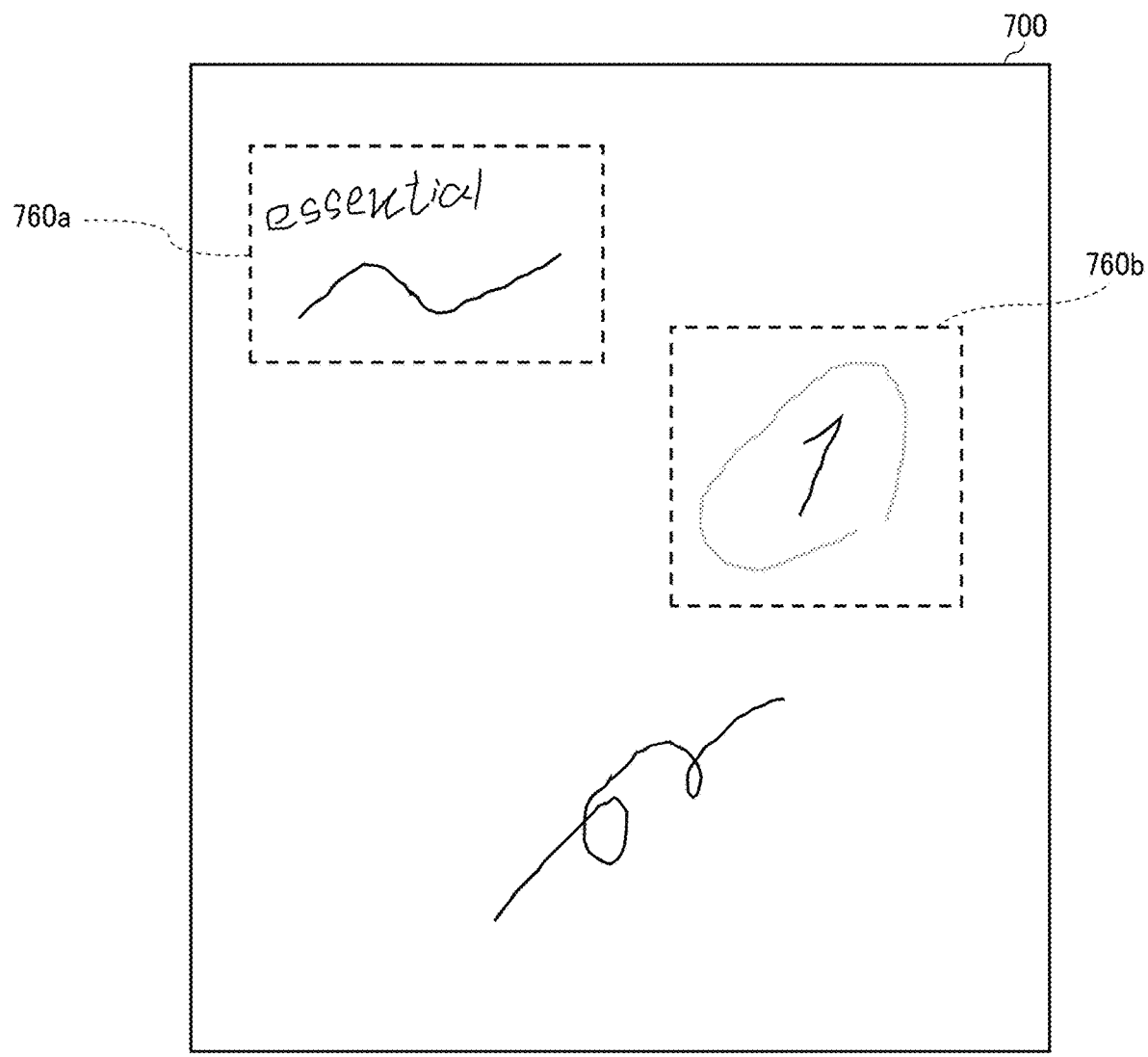
FIG. 20 is an illustration for describing another example of a display area in a sharing area, according to an embodiment of the present disclosure.

A description is now given of another example of a display screen displayed on the possible area selection screen 400, with reference to FIG. 20. FIG. 20 is an illustration for describing another example of a display area in the sharing area. As illustrated in FIG. 20, the setting unit 21A of the display apparatus 10A may set areas 760a and 760b each of which including a specific character, a specific figure, or a specific color input to the sharing area 700 as possible display areas. In the example of FIG. 20, an area including a character string "essential" and an area including object having a color (for example, red) different from the other color (for example, black) of a normal stroke are the possible display areas. A known technique such as optical character recognition (OCR) is used to recognize the character string.

Figure 21A:
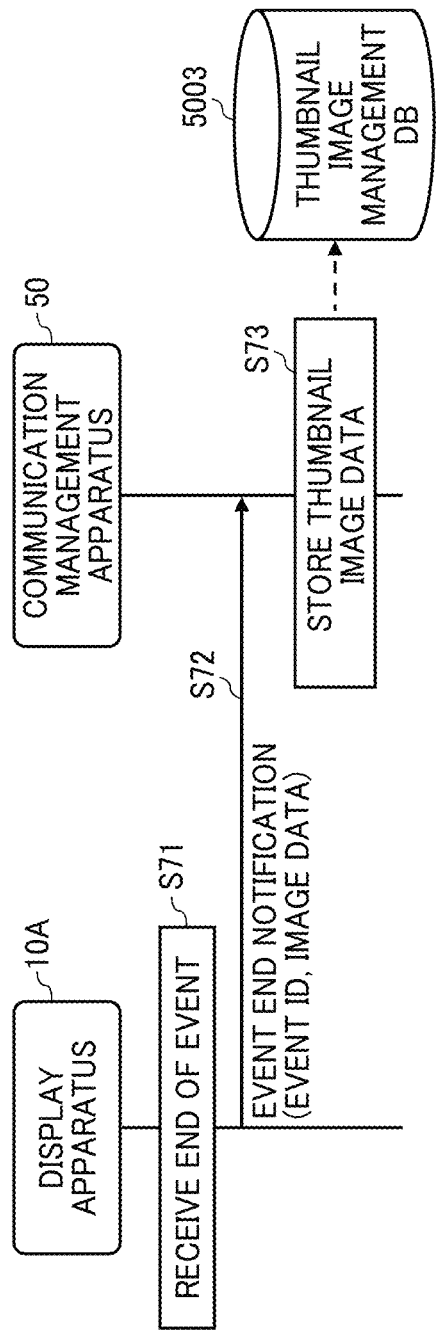
FIG. 21A is a sequence diagram illustrating an example of processing of storing a thumbnail image at the end of an event, according to an embodiment of the present disclosure.
Figure 21B:
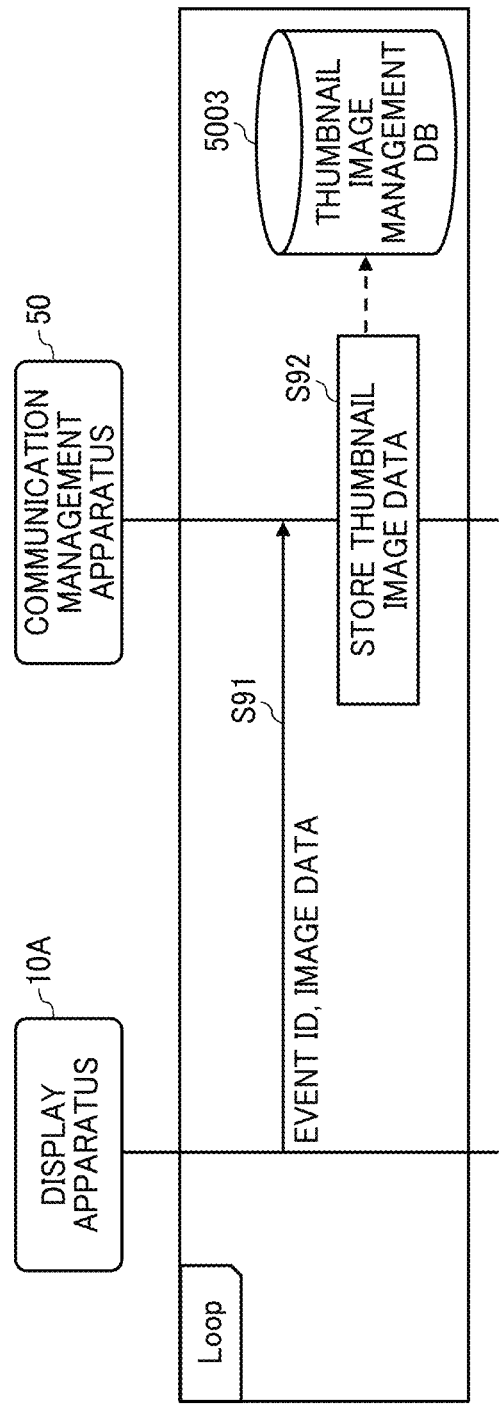
FIG. 21B is a sequence diagram illustrating an example of processing of storing a thumbnail image while an event is being executed, according to an embodiment of the present disclosure.

Storing Thumbnail Image when Event is Executed:
Referring to FIG. 21A, FIG. 21B, and FIG. 22 processes of storing an image displayed on a display screen as a thumbnail image when an event is executed are described. In the above-described example, the thumbnail image is generated when the event is resumed. However, reading the event file or generating the thumbnail image takes time, and the event may not be smoothly resumed, accordingly. Referring to FIG. 21A and FIG. 21B, an example in which a thumbnail image of a display screen is stored in the communication management apparatus 50 when an event is executed is described.

FIG. 21A is a sequence diagram illustrating an example of processing of storing a thumbnail image at the end of an event. The reception unit 12A of the display apparatus 10A receives the end of the event when the user A performs a predetermined input operation (step S71). Then, the transmission/reception unit 11A transmits an event end notification indicating that the event is ended to the communication management apparatus 50 (step S72). The event end notification includes an event ID of the event to be ended and image data of a display screen. The transmission/reception unit 51 of the communication management apparatus 50 receives the event end notification transmitted from the display apparatus 10A. Next, the storing/reading unit 59 of the communication management apparatus 50 stores the image data received in step S72 in the thumbnail image management DB 5003 as thumbnail image data (step S73).

FIG. 22 is a conceptual diagram illustrating an example of a thumbnail image management table. The thumbnail image management table manages thumbnail image data of a display screen displayed in an event. In the storage unit 5000, a thumbnail image management DB 5003 is stored, for example, in the form of the thumbnail image management table illustrated in FIG. 22. In the thumbnail image management table, for each event, an event ID for identifying an event, a storage location of thumbnail data, and a user ID for identifying a user who has displayed a display screen corresponding to a thumbnail image are stored in association with each other. The storage location indicates information on a storage destination in which the thumbnail image data is stored. The storage location may be a data path inside the communication management apparatus 50, or may be a URL or a URI outside the communication management apparatus 50. The communication management apparatus 50 stores and manages the thumbnail image of the display screen displayed by the user for each event using the thumbnail image management table. The thumbnail image management table may be configured to manage thumbnail images by using a user name for identifying a user together with or in alternative to a user ID.

FIG. 21B is a sequence diagram illustrating an example of processing of storing a thumbnail image while an event is being executed. The transmission/reception unit 11A of the display apparatus 10A transmits an event ID of an event being executed and an image of a display screen to the communication management apparatus 50 while the event is being executed (step S91). The transmission/reception unit 51 of the communication management apparatus 50 receives the event ID and the image data transmitted from the display apparatus 10A. Next, the storing/reading unit 59 of the communication management apparatus 50 stores the image data received in step S91 in the thumbnail image management DB 5003 (see FIG. 22) as thumbnail image data (step S92). The data sharing system 1 repeats the processing of step S91 and step S92 at predetermined time intervals while an event is being executed.

As a result, as illustrated in FIG. 21B, the data sharing system 1 stores the latest thumbnail image of the display screen on the display apparatus 10A by transmitting the image of the display screen to the communication management apparatus 50 as appropriate and updating the stored thumbnail image. In comparison with the example of FIG. 21A, in the example of FIG. 21B a thumbnail image is stored even when the event does not end normally, for example, in a case that the display apparatus 10A ends abnormally. In the example of FIG. 21B, the thumbnail image is transmitted from the display apparatus 10A to the communication management apparatus 50 at predetermined time intervals, but the thumbnail image may be transmitted when the display screen of the display apparatus 10A is changed. In the example of FIG. 21A, the thumbnail image data is transmitted and received at the end of an event, and the communication load for data communication is less than that in the example of FIG. 21B.

Figure 23:
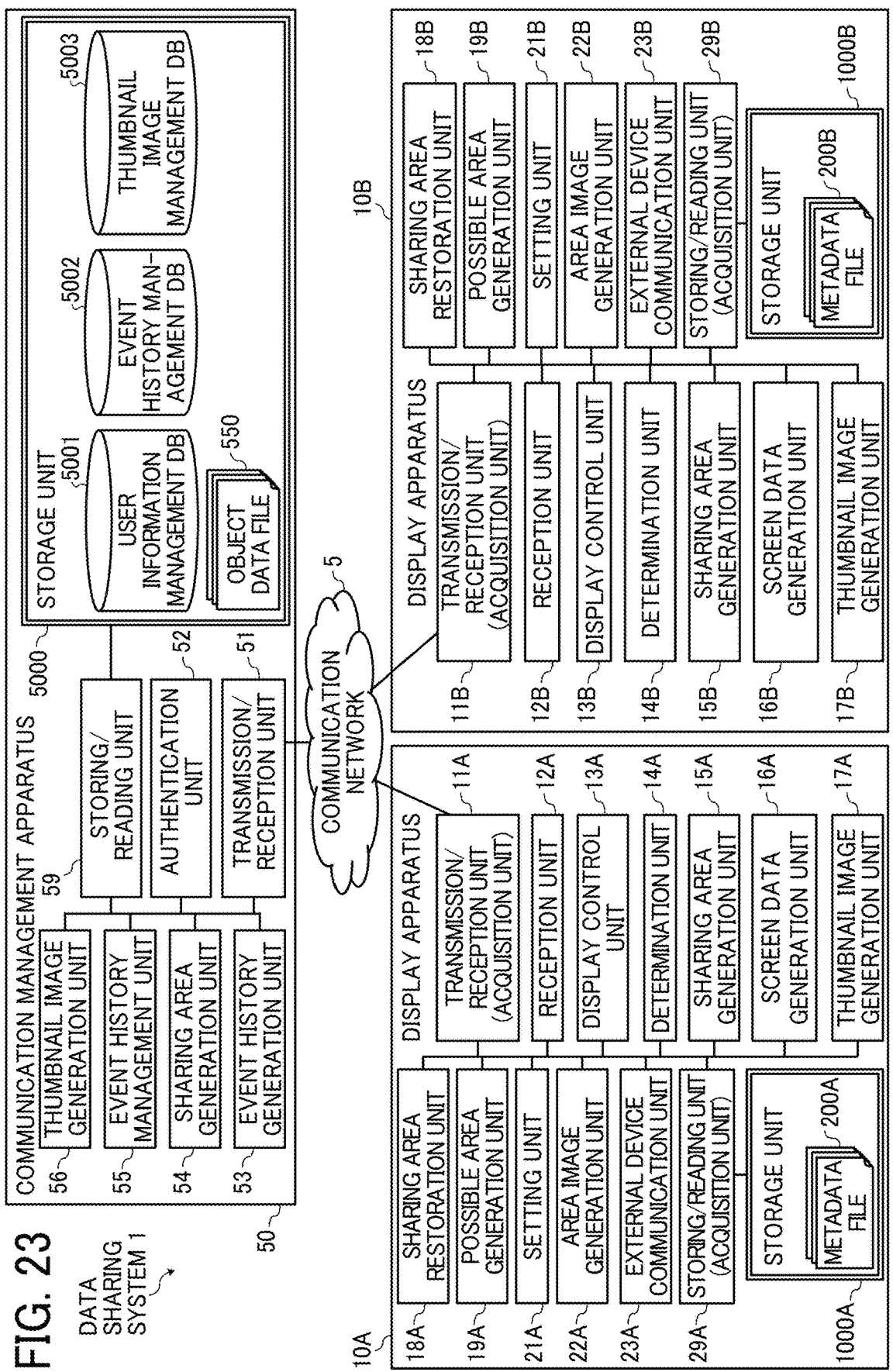
FIG. 23 is a diagram illustrating another example of a functional configuration of a data sharing system according to an embodiment of the present disclosure.

Storing Metadata File in Display Apparatus:

Referring to FIG. 23 and FIG. 24, an example in which a metadata file including display history data indicating an operation log of a user is stored in the display apparatus 10 is described. FIG. 23 is a diagram illustrating an example of a functional configuration of the data sharing system 1. As illustrated in FIG. 23, the display apparatus 10A and the display apparatus 10B store a metadata file 200A and a metadata file 200B (metadata file 200), respectively, in addition to the configuration illustrated in FIG. 7. Each of the storing/reading unit 29A and the storing/reading unit 29B function as an acquisition unit, and read and acquire the metadata files 200 stored in the respective storage units 1000.

The metadata file 200 stored in the display apparatus 10 includes an operation log of a user who uses the display apparatus 10. FIG. 24 is a view of an example of the metadata file 200 stored in the display apparatus 10. FIG. 24 is a diagram illustrating an example of the metadata file. In the example of FIG. 24, the metadata file 200 is indicated as an operation log of a user "Taro" having the user ID "A001." The operation log is stored in the display apparatus 10 used by the user "Taro" having the user ID "A001." Unlike the metadata file 500 illustrated in FIG. 10, the metadata file 200 includes the operation log (OperationLog) of a specific user (for example, the user "Taro" having the user ID "A001") alone.

Since the metadata file records an operation log for each user, when the number of users participating in an event increases, a size of the metadata increases, and a size of the entire event file increases. To cope with this, the data sharing system 1 stores the metadata file 200 in the display apparatus 10, in other words, in a distributed manner, because it is sufficient that the metadata itself stores the operation log of the user who uses the display apparatus 10. This allows the data sharing system 1 to reduce the size of the event file and an amount of data stored in the communication management apparatus 50, and this also allows the display apparatus 10 to shorten the time for downloading (acquiring) the event file.

Figure 25:
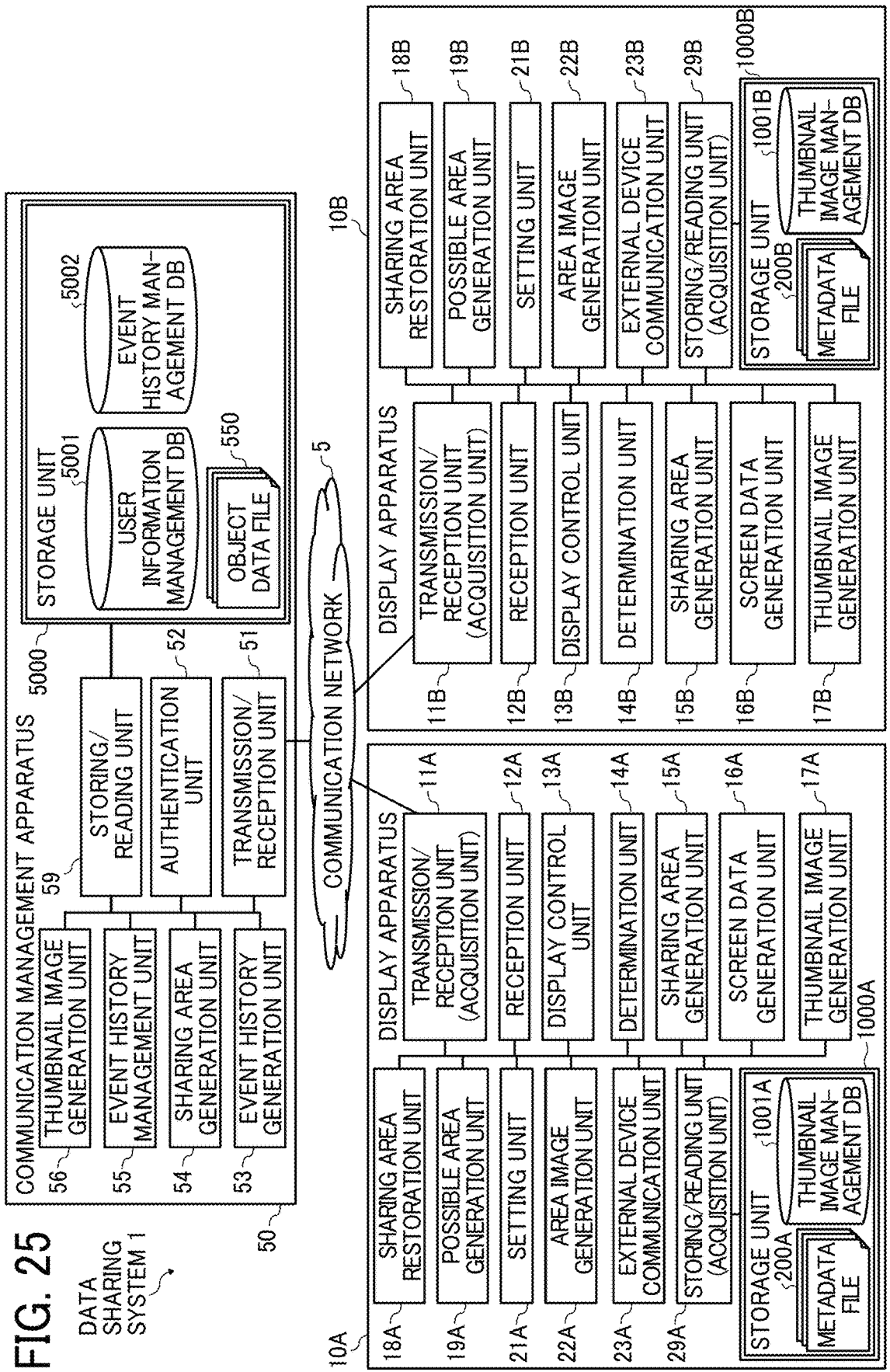
FIG. 25 is a diagram illustrating still another example of a functional configuration of a data sharing system according to an embodiment of the present disclosure.
Figure 27:
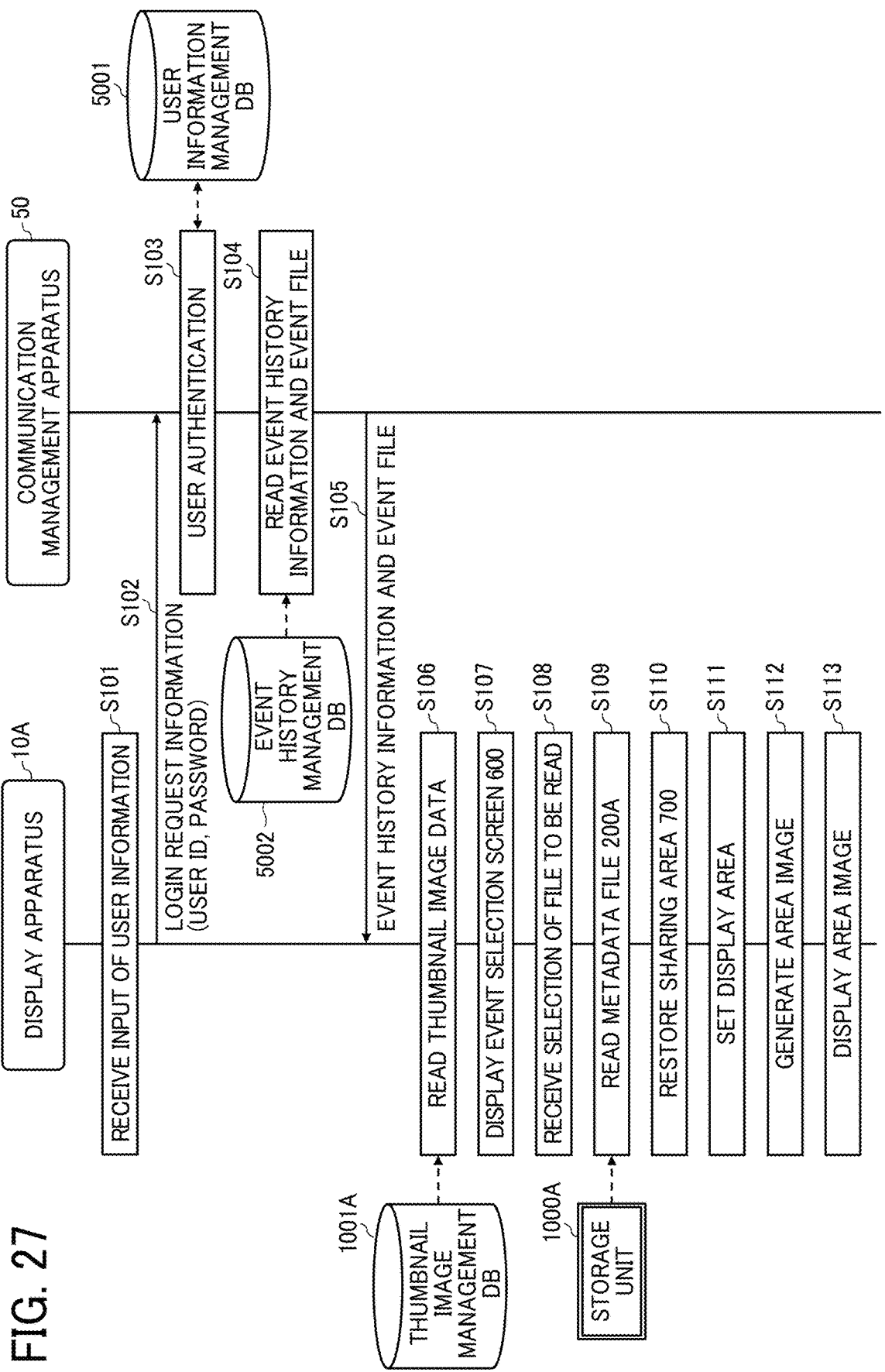
FIG. 27 is a sequence diagram illustrating an example of operation of displaying a screen at a time of resuming an event, according to an embodiment of the present disclosure.

Storing a Thumbnail Image in Display Apparatus:

Referring to FIG. 25 to FIG. 27, an example in which a thumbnail image of a display screen displayed by a user is stored in the display apparatus 10 is described. FIG. 25 is a diagram illustrating an example of a functional configuration of the data sharing system 1. As illustrated in FIG. 25, the display apparatus 10A and the display apparatus 10B include a thumbnail image management DB 1001A and a thumbnail image management DB 1001B (thumbnail image management DB 1001), respectively, for managing thumbnail images of respective display screens, in addition to the configuration illustrated in FIG. 23.

FIG. 26 is a conceptual diagram illustrating an example of a thumbnail image management table. In the storage unit 1000, a thumbnail image management DB 5003 is stored, for example, in the form of the thumbnail image management table illustrated in FIG. 26. In the example of FIG. 26, the thumbnail image management table stored in the display apparatus 10 and used by a user "Taro" having the user ID "A001" is illustrated. Unlike the example stored in the communication management apparatus 50 illustrated in FIG. 22, the thumbnail images of display screens included in the thumbnail image management table are ones that are displayed, by the user, with the display apparatus 10 corresponding to the storage destination.

Referring to FIG. 27, processing at a time of resuming an event in a case where a thumbnail image is stored in advance in the display apparatus 10A is described. FIG. 27 is a sequence diagram illustrating an example of operation of displaying a screen at a time of resuming an event. The processing from step S101 to step S105 illustrated in FIG. 27 is performed in the same or substantially the same manner as the processing from step S51 to step S55 illustrated in FIG. 16, and a redundant description thereof is omitted below.

In step S106, the storing/reading unit 29A of the display apparatus 10A searches the thumbnail image management DB 1001A using the event ID included in the event history information received in step S105 as a search key, thereby reading a thumbnail image associated with the event ID same as the received event ID (step S106). The display control unit 13A causes the display unit (for example, the display 280 or the display 306) to display the event selection screen 600 including the thumbnail image read in step S106 (step S107).

Next, when the user A selects the selection button 601 and presses the "OPEN" button 608, the reception unit 12A receives the selection for reading a corresponding file that is an event file to be read (step S108). The storing/reading unit 29 reads the metadata file 200A of the event selected in step S108 from the storage unit 1000A (step S109). Then, the sharing area restoration unit 18A uses the event file received in step S105 and the metadata file 200A read in step S109 to restore the sharing area 700, which is shared with another display apparatus 10 (for example, the display apparatus 10B) (step S110).

Processing from step S111 to step S113 is performed in the same or substantially the same manner as the processing from S40 to S42 described above with reference to FIG. 16, and thus redundant descriptions thereof are omitted below. Although in the above description with reference to FIG. 27, the thumbnail image is stored when an event is executed as illustrated in FIG. 21A or FIG. 21B, the display apparatus 10A may generate the thumbnail image when an event is resumed and store the generated thumbnail image in the thumbnail image management DB 1001, as described with reference to FIG. 16.

As described above, the data sharing system 1 reduces the amount of data stored in the communication management apparatus 50 by storing the thumbnail image in the display apparatus 10. Alternatively, the thumbnail image may be stored in the display apparatus 10, and the metadata file may be stored in the communication management apparatus 50.

Variations of Embodiment

Referring to FIG. 28 to FIG. 32, a variation of the data sharing system according to an embodiment is described. In the variation, the same reference numbers are allocated to elements (members or components) having the same function as those of the above-described embodiments, and redundant description thereof is omitted below. The data sharing system 1 according to the variation is an example of a system in which a sharing area shared and displayed by the plurality of display apparatuses 10 includes multiple pages.

Figure 28:
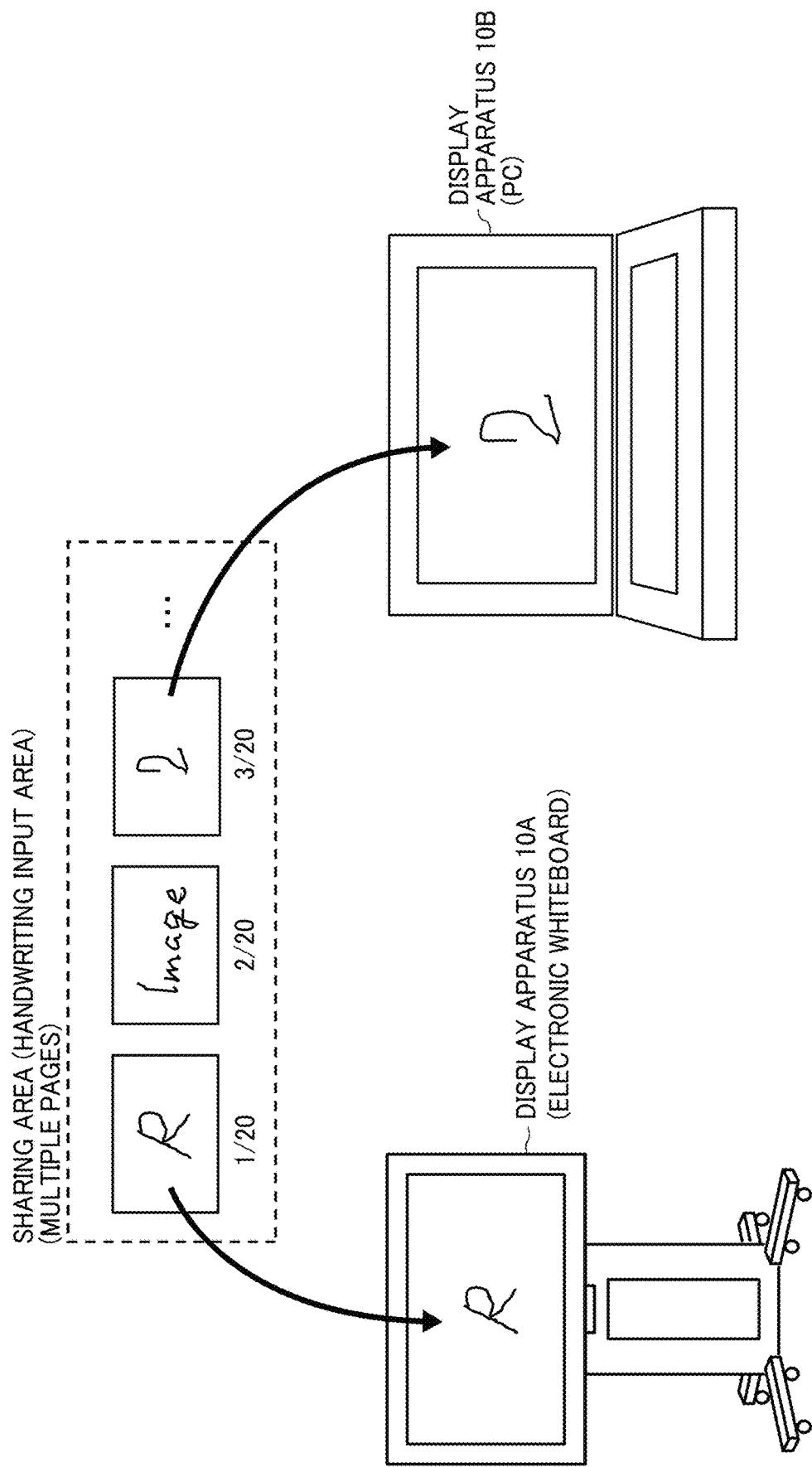
FIG. 28 is a schematic diagram illustrating an example of how a sharing area is displayed at a plurality of display apparatuses, according to a variation of the embodiments of the present disclosure.

FIG. 28 is a schematic diagram illustrating an example of how the sharing area is displayed at the display apparatuses 10 according to the variation of embodiments. In FIG. 28, the display apparatus 10A and the display apparatus 10B share the sharing area divided into multiple pages, to conduct an event such as a teleconference. Each of the display apparatus 10A and the display apparatus 10B displays a desired page among the multiple pages included in the sharing area on the display screen. Further, since the display apparatus 10A and the display apparatus 10B display different pages respectively, the users can view desired pages respectively during the event. For example, each page of the multiple pages included in the sharing area is an area having the same size as that of the display screen of the display apparatus 10. In another example, each page is an expandable area in which handwriting can be input without any size restrictions as in the above-described embodiments.

FIG. 29 is a view of an example of a metadata file according to the variation of the embodiments. The metadata file 500a illustrated in FIG. 29 is stored in the storage unit 5000 of the communication management apparatus 50, in the substantially same manner as the metadata file 500 illustrated in FIG. 10. Compared with the metadata file 500 illustrated in FIG. 10, the metadata file 500a includes, as the area information indicated in the display area ("ViewArea") for each user, information of a page number ("Page") in addition to the coordinate position ("X", "Y") and the size ("Width", "Height") of the display area. Note that even when a metadata file is stored in the display apparatus 10 as illustrated in FIG. 24, information on a page number (Page) is included in the substantially same manner.

FIG. 30 is a view of an example of an object data file, according to a variation of the embodiments. The object data file 550a illustrated in FIG. 30 is stored in the storage unit 5000 of the communication management apparatus 50, in the substantially same manner as the object data file 550 illustrated in FIG. 11. Compared with the object data file 550 illustrated in FIG. 11, the object data file 550a includes information on a page number ("Page") on which an object is input as the detailed data information ("Data") indicated in the object data ("Objects").

Figure 31:
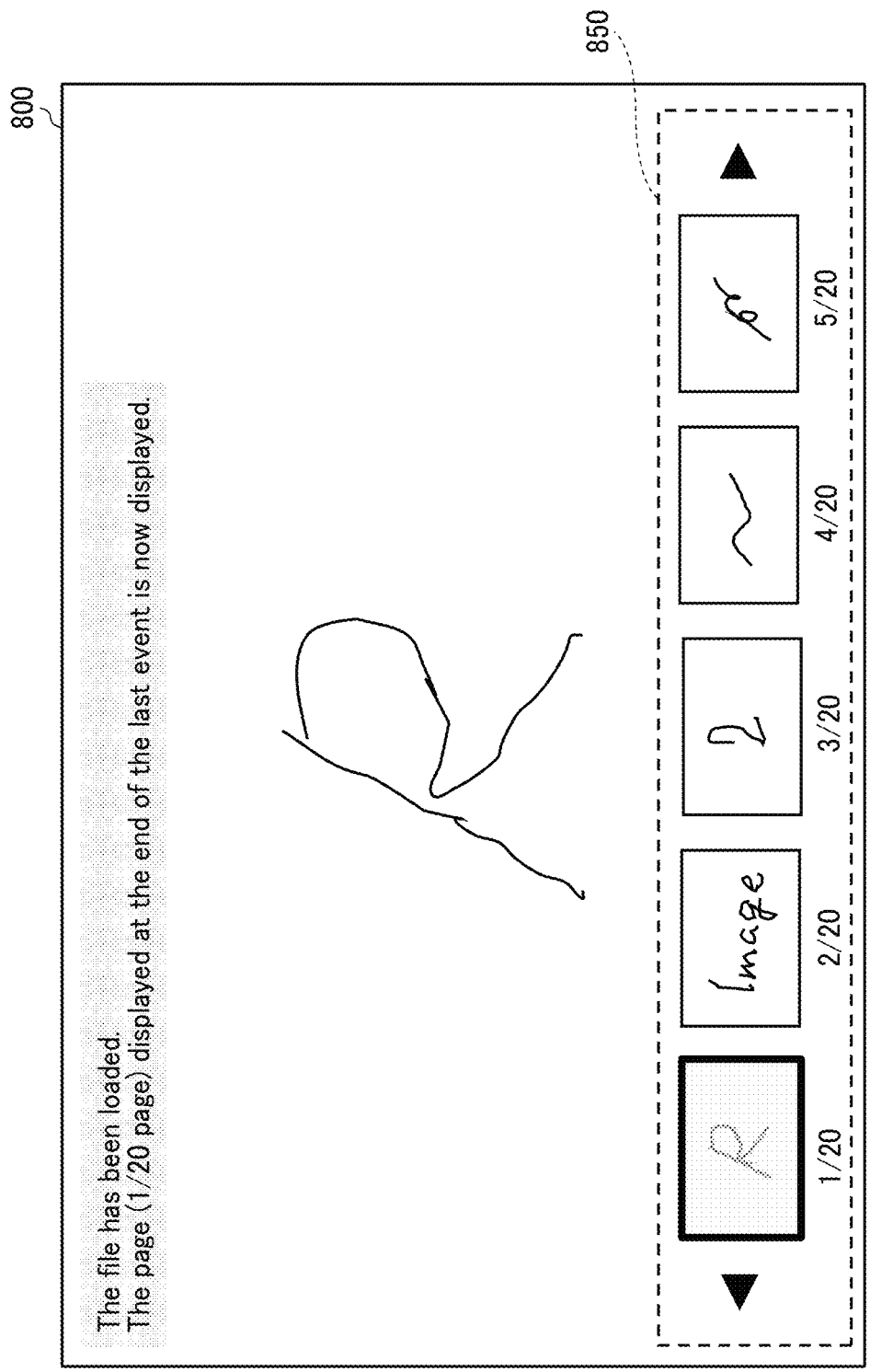
FIG. 31 is a diagram illustrating an example of a display screen, according to a variation of the embodiments of the present disclosure.

FIG. 31 is a diagram illustrating an example of a display screen, according to the variation of the embodiments. A display screen 800 illustrated in FIG. 31 displays, as an area image, one of a plurality of pages each of which is included in a sharing area. The display control unit 13 of the display apparatus 10 displays a page set as a display area by the setting unit 21 on the display screen 800 as an area image. In the example of FIG. 31, the first page of the plurality of pages in each of which an object is input is displayed on the display screen 800. The display screen 800 includes a panoramic screen 850 indicating the sharing area including the plurality of pages in a reduced manner in addition to the area image. In the panoramic screen 850, the page being displayed on the display screen 800 is highlighted so as to be identifiable by the user.

Figure 32:
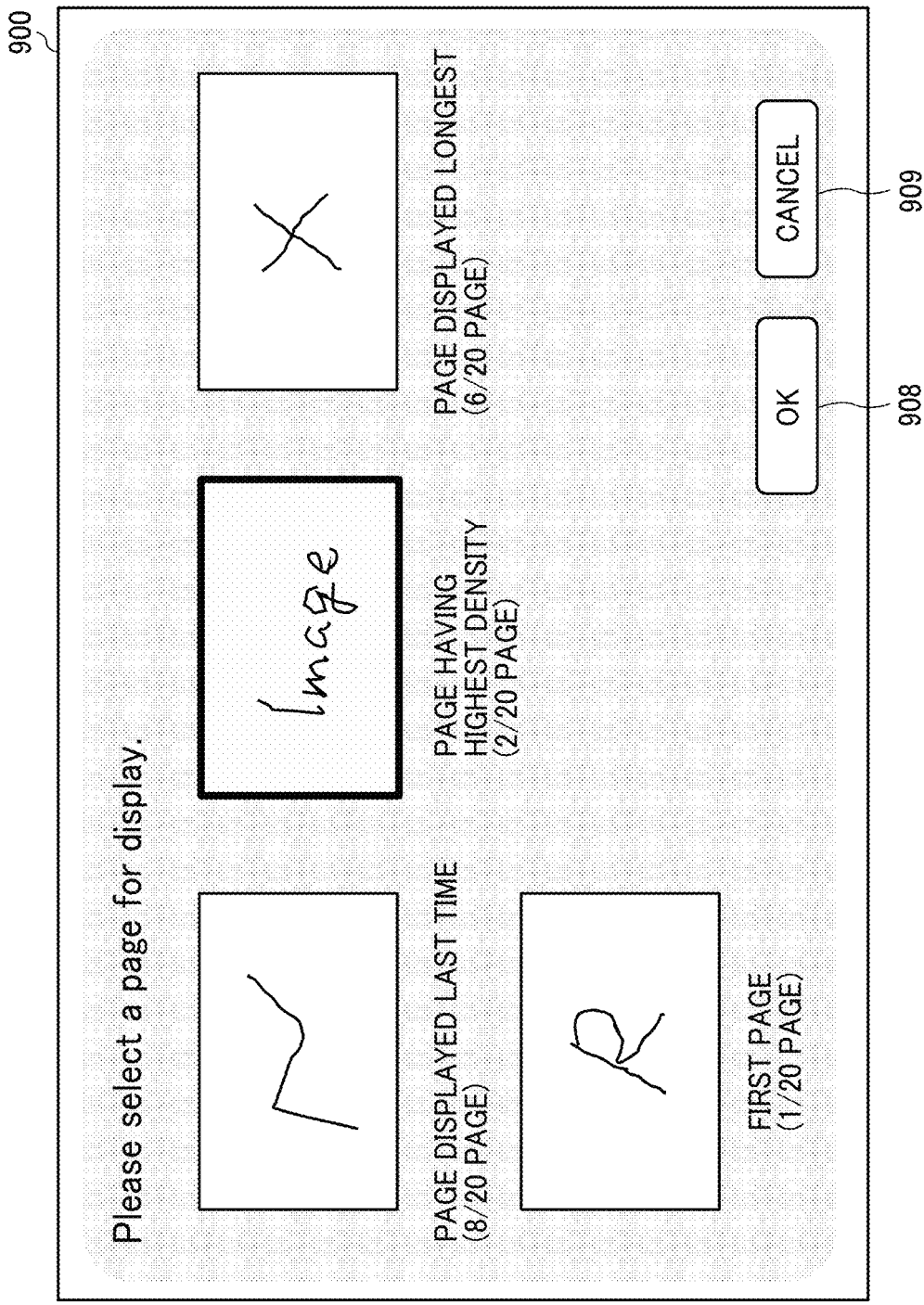
FIG. 32 is a diagram illustrating an example of a possible area selection screen, according to a variation of the embodiments of the present disclosure.

FIG. 32 is a diagram illustrating an example of a possible area selection screen, according to the variation of the embodiment. A possible area selection screen 900 illustrated in FIG. 32 is displayed at the step S58 described above when the sharing area includes the plurality of pages. In the possible area selection screen 900, possible display pages each of which may be displayed are displayed. Similar to the possible area selection screen 400 of FIG. 19, the possible area selection screen 900 includes a page that is displayed last time (at the end of the last event), a page that has the highest density, and a page that is displayed for the longest period of time in the last event as the possible display areas (pages). In addition, the possible area selection screen 900 displays a page corresponding to the first page of the plurality of pages included in the sharing area as possible display area (page). In the example of FIG. 32, the user selects a possible area (possible page) corresponding to the "PAGE HAVING HIGHEST DENSITY (2/20 PAGE)." The possible areas may be set in page units as illustrated in FIG. 32, or may be set in area units in each page.

As described above, the data sharing system 1 according to the variation reproduce the display screen displayed in the past event based on the operation log of the user with respect to each page at the time of resuming the event even when the sharing area includes the plurality of pages.

As described above, the data sharing system 1 sets, for each user, a part of the sharing area 700 to a display area to be displayed in accordance with an operation log of each user in a past event, so that a different display screen is available to be displayed for each user who participates in the event when the event is resumed. For example, a screen desired by a user is displayed on the display apparatus 10 used by the user when an event is resumed. The data sharing system 1 allows the user to get the picture of the event in the past when the user views the display screen at a time of resuming the event, resulting in resuming the event smoothly. In addition, the data sharing system 1 presents to each user the possible display areas based on an operation log of the user with the possible area selection screen 400, allowing the user to select an optimum area with which the user get the picture of the event held in the past easily.

As described above, a display apparatus according to an embodiment of the present disclosure is the display apparatus 10 that shares data including the sharing area 700 that is available to be shared with one or more other display apparatuses. The display apparatus 10 acquires history data (for example, metadata and object data) indicating execution history related to the events each of which is executed by a plurality of users. The display apparatus 10 causes the display screen 100 or 800 to display at least a part of the sharing area 700 that is generated based on the acquired history data. The at least the part of the sharing area 700 is specified or identified based on an operation log of a specific user. The operation log of the specific user is included in the history data. Accordingly, the display apparatus 10 displays a screen desired by the user at a time of resuming the event.

Further, a display apparatus according to an embodiment of the present disclosure displays a possible area selection screen, for example the possible area selection screen 400 and the possible area selection screen 900) indicating a plurality of possible areas, which is a plurality of selectable areas, included in the sharing area 700 based on an operation log of a specific user included in the acquired history data (for example, metadata and object data), receives selection of one of the plurality of possible areas, and sets the one of the plurality of possible areas to a display area. Accordingly, the display apparatus 10 presents, to each user, the possible display areas that may be displayed when the event is resumed based on the operation log of the corresponding user in the past event of the user, thereby allowing the user to select an optimum area with which the user get the picture of the event executed in the past easily.

In addition, a data sharing system according to an embodiment of the present disclosure is the data sharing system 1 in which that is available to be shared between and displayed on the display apparatus 10A (an example of a first display apparatus) and the display apparatus 10B (an example of a second display apparatus) share data included in the sharing area 700 and each of the display apparatus 10A and the display apparatus 10B displays the data. The display apparatus 10A and the display apparatus 10B obtain history information (e.g., metadata and object information) indicating a history of events performed by a first user (e.g., user A) and a second user (e.g., user B). The display apparatus 10A displays, on the display screen 100 (an example of a first display screen) of the display apparatus 10A, a first area identified based on the operation log of the first user included in the history. The first area is at least a part of the sharing area 700 generated based on the acquired history data. The display apparatus 10B displays, on the display screen 100 (an example of a second display screen) of the display apparatus 10B, a second area identified based on the operation log of the second user included in the history. The second area is at least a part of the sharing area 700 generated based on the acquired history data. Accordingly, the data sharing system 1 displays a different area for each user on the corresponding display screen when an event is resumed.

According to one or more embodiments, a non-transitory computer-executable medium storing a program storing instructions is provided, which, when executed by a processor, causes the processor to perform a method. The method includes acquiring history data indicating a record of an event executed with a plurality of display apparatuses. The plurality of display apparatuses shares data of a sharing area that is an area shared by the plurality of display apparatuses and is available to be displayed with each of the plurality of display apparatuses used by a corresponding user. The method includes displaying, on a display screen, at least a part of the sharing area as a display area. The sharing area is generated based on the history data. The display area is set based on an operation log included in the history data. The operation log is related to a specific user.

In a known method, in case of resuming an event such as a conference that is previously executed using a plurality of display apparatuses each of which is used by a corresponding user to share a screen, a desired screen of each user is not displayed.

A display apparatus according to one of the embodiments set a display area to be displayed on a display screen based on an operation log of a user, and this allows the display apparatus to display a screen desired by a user of the display apparatus.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for the machine learning, for example, any one of supervised learning, unsupervised learning, semi-supervised learning, reinforcement learning, and deep learning, or a combination of two or more of these learning.

The display apparatus, the data sharing system, the display method, and the program according to the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A display apparatus, comprising:
circuitry configured to:
acquire history data including a screen image which has occurred in a past of an event and a record of the event executed with a plurality of display apparatuses including the display apparatus, the plurality of display apparatuses sharing data of a sharing area shared by the plurality of display apparatuses, the sharing area being generated based on the screen image and the record of the event of the history data; and
display, on a display screen, at least a part of the sharing area as a display area for the display apparatus, the display area being set based on an operation log included in the history data and including at least a part of the screen image from the history data, the operation log being related to a user at the display apparatus,
wherein:
the circuitry is further configured to determine an area that is displayed longer than other areas in the sharing area in the event, and
the display area is the area determined by the circuitry that is displayed longer than other areas in the sharing area in the event.

2. The display apparatus of claim 1, wherein
the history data includes a record of objects input with respect to the sharing area, and
the display area is an area that includes a largest number of objects input with respect to the sharing area.

3. The display apparatus of claim 2, wherein
the display area is an area that includes an object representing one of a specific character, a specific figure, and a specific color in the sharing area.

4. The display apparatus of claim 1, wherein
the circuitry displays, on the display screen, information on at least one of a position or a size of the display area in the sharing area.

5. The display apparatus of claim 1, wherein the circuitry restores the sharing area based on the history data,
sets the display area from a plurality of areas included in the sharing area based on the operation log, and
displays, on the display screen, the display area.

6. The display apparatus of claim 5, wherein the circuitry displays, on the display screen, a selection screen including a plurality of selectable areas based on the operation log,
receives a selection of one of the plurality of selectable areas, and
sets the one of the plurality of selectable areas to the display area.

7. The display apparatus of claim 1, wherein the circuitry transmits, to a communication management apparatus, thumbnail image data of the display screen at an end of the event, the communication management apparatus including a memory in which data of the sharing area is stored, and
receives the history data and the thumbnail image data from the communication management apparatus.

8. The display apparatus of claim 7, wherein
the circuitry transmits, to the communication management apparatus, the thumbnail image data of the display screen at predetermined time intervals while the event is being executed.

9. The display apparatus of claim 1, wherein the circuitry stores, in a memory, thumbnail image data of the display screen, and
acquires the thumbnail image data from the memory.

10. The display apparatus of claim 1, wherein
the sharing area is a hand drafted input area that is shared by the plurality of display apparatuses and is available to receive a hand drafted input performed according to a user operation with each of the plurality of display apparatuses.

11. The display apparatus of claim 1, wherein
the sharing area includes a plurality of pages.

12. A data sharing system, comprising:
circuitry configured to:
acquire history data including a screen image which has occurred in a past of an event and a record of the event executed with a plurality of display apparatuses, the plurality of display apparatuses sharing data of a sharing area being generated based on the screen image and the record of the event of the history data; and
control at least one of the plurality of display apparatuses to display, on a display screen, at least a part of the sharing area as a display area for the at least one apparatus, the display area being set based on an operation log included in the history data and including at least a part of the screen image from the history data, the operation log being related to a user at the at least one display apparatus,
wherein:
the circuitry is further configured to determine an area that is displayed longer than other areas in the sharing area in the event, and
the display area is the area determined by the circuitry that is displayed longer than other areas in the sharing area in the event.

13. A display control method, comprising:
acquiring history data indicating a screen image which has occurred in a past of an event and a record of the event executed with a plurality of display apparatuses, the plurality of display apparatuses sharing data of a sharing area shared by the plurality of display apparatuses, the sharing area being generated based on the screen image and the record of the event of the history data;
displaying, on a display screen, at least a part of the sharing area as a display area, the display area being set based on an operation log of a user included in the history data and including at least a part of the screen image from the history data; and determining an area that is displayed longer than other areas in the sharing area in the event, wherein the display area is the area determined to be displayed longer than other areas in the sharing area in the event.

\* \* \* \* \*